US006494143B1

(12) United States Patent
Bolonkin

(10) Patent No.: US 6,494,143 B1
(45) Date of Patent: Dec. 17, 2002

(54) BOLONKIN'S METHOD MOVEMENT OF VEHICLES AND INSTALLATION FOR IT

(75) Inventor: Alexander Alexandrovich Bolonkin, Brooklyn, NY (US)

(73) Assignee: Alexander Bolonkin, Brooklyn, NY (US)

( * ) Notice: Subject to any disclaimer, the term of this patent is extended or adjusted under 35 U.S.C. 154(b) by 0 days.

(21) Appl. No.: 09/893,060

(22) Filed: Jun. 28, 2001

(51) Int. Cl.[7] ................................................. B61B 10/00

(52) U.S. Cl. ..................... 104/173.1; 104/89; 212/76

(58) Field of Search ............................ 104/89, 91, 93, 104/173.1; 212/71, 76

(56) References Cited

U.S. PATENT DOCUMENTS

| | | | | |
|---|---|---|---|---|
| 3,221,897 A | * | 12/1965 | Matheson | 212/71 |
| 3,260,479 A | * | 7/1966 | Eickmann | 104/112 |
| 3,346,127 A | * | 10/1967 | Pelton et al. | 212/71 |
| 3,359,919 A | * | 12/1967 | Stewart | 212/71 |
| 3,369,673 A | * | 2/1968 | Mosher | 212/71 |
| 3,807,577 A | * | 4/1974 | Bell | 104/89 |
| 3,858,518 A | * | 1/1975 | Nyman | 104/173.1 |
| 4,055,316 A | * | 10/1977 | Chipper et al. | 212/71 |
| 5,080,302 A | * | 1/1992 | Hoke | 212/71 |

\* cited by examiner

Primary Examiner—S. Joseph Morano
Assistant Examiner—Lars A. Olson

(57) ABSTRACT

The method and facilities for movement of vehicles over long distances are presented. The Method is comprised of the following steps:

(a) connecting at least two main rollers displaced over a long distance: one in a port of departure and one in a port of arrival, by a series of closed-loop, light, strong cable (consisting of one or more loops) located at least in one of the following places: in the air, on the ground surface, on the water surface;

(b) supporting said cable by at least one of the following devices: wings, air balloons, columns, rollers;

(c) connecting at least one of said main rollers to an engine;

(d) running said engine;

(e) connecting at least one load vehicle to said cable at departure port;

(f) accelerating said vehicle;

(g) disconnecting said vehicles from said cable at arrival port;

(h) braking said vehicles.

An Installation using Method for Movement of vehicles comprising: A set of rollers disposed in the ports of departure, arrival, at points of direction change, and at middle points; a set of light, strong, closed-loop cables (loops) connect the ports of departure and arrival located over a long distance; engines placed near rollers and connected at least to one of said rollers; vehicles for transportation of people and loads; devices for connection and disconnection of the vehicles to the cable and placed on the vehicles.

The author also proposes 5 projects: an air bridge over the Straits of Gibraltar, airlines connecting New York to Washington D.C., and New York to Paris, airline for delivery of fuel gas, and typical Auto Highways or city passenger transit systems.

17 Claims, 13 Drawing Sheets

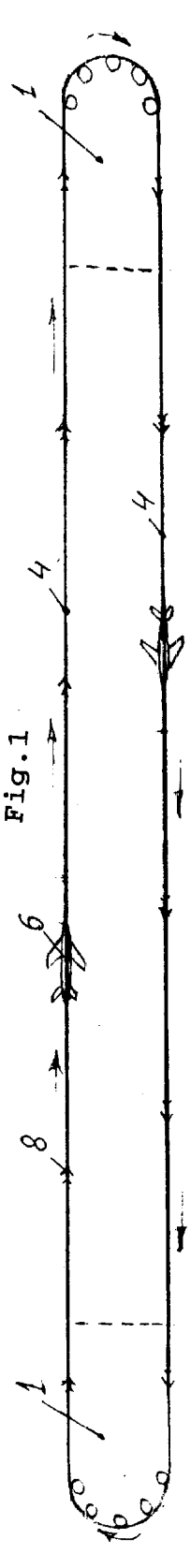
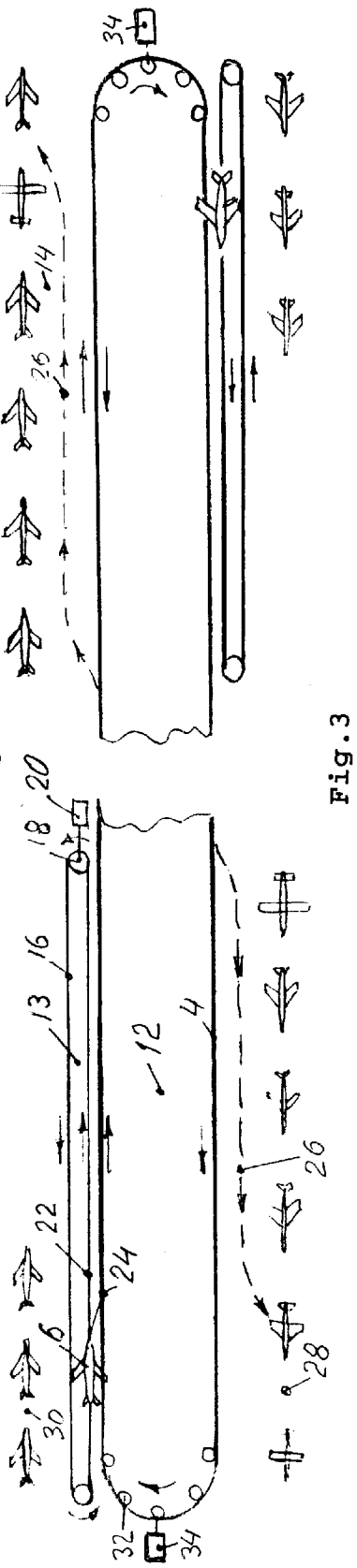
Fig. 1
Fig. 2
Fig. 3

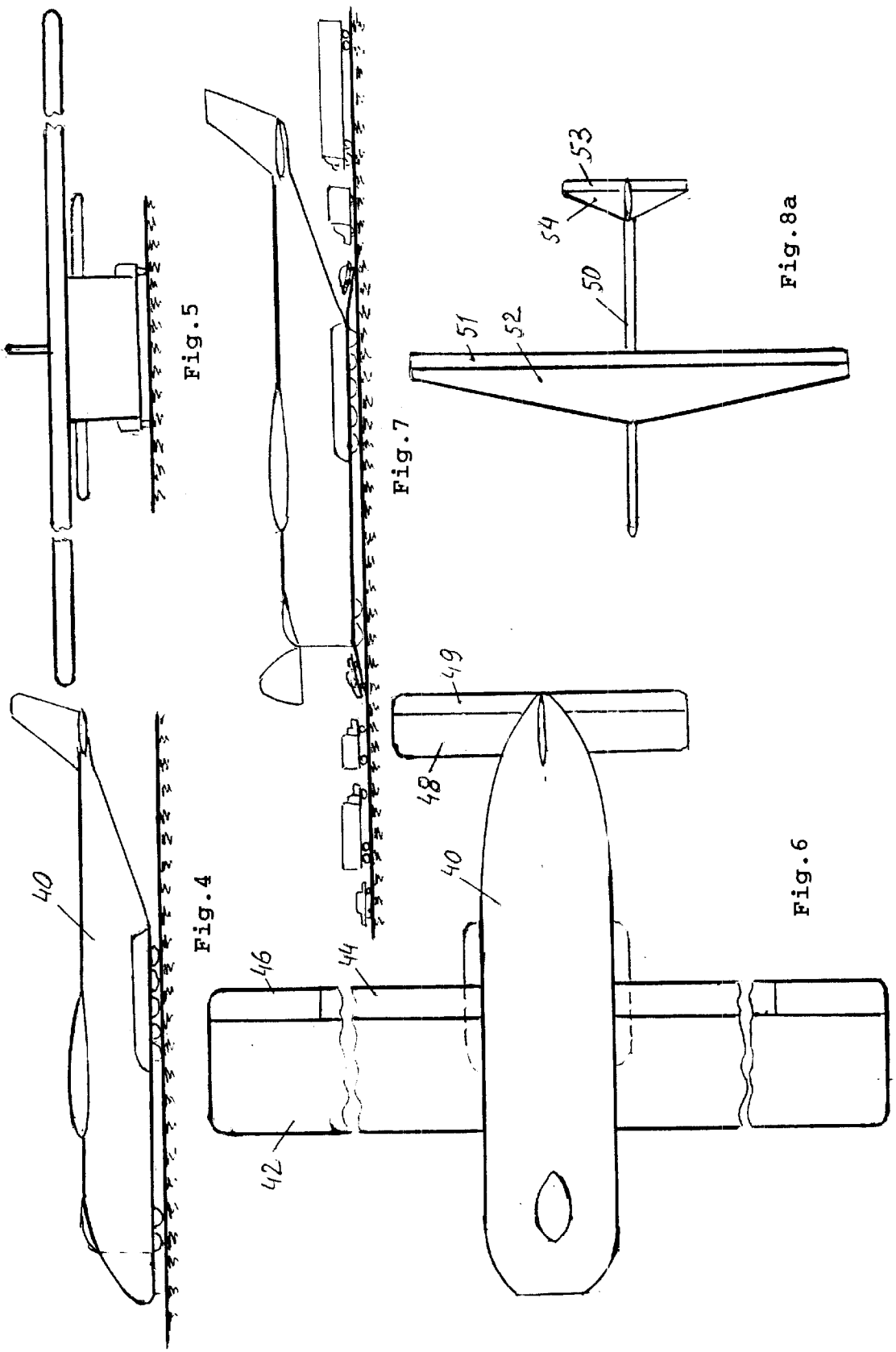

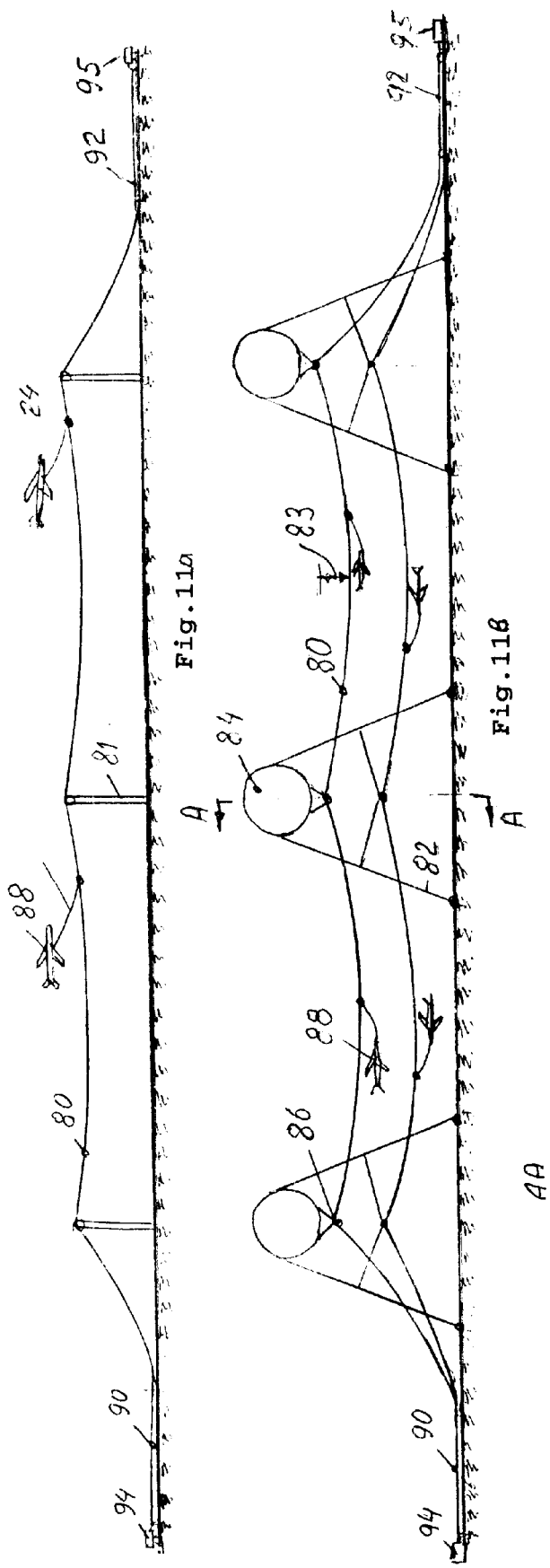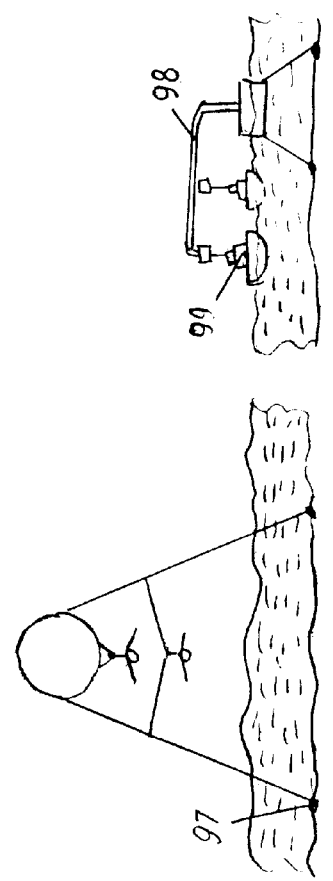

BOLONKIN'S METHOD MOVEMENT OF VEHICLES AND INSTALLATION FOR IT

GROSS-REFERENCE TO RELATED APPLICATIONS

Not Applicable

REFERENCE TO A MICROFICHE APPENDIX

Not Applicable

BACKGROUND OF THE INVENTION

1. Field of the Invention

This invention proposes new methods and facilities for moving payloads and people from one place to other. The author proposes using the aerodynamics and a new concept of cable motion and propulsion systems for this purpose.

2. Description of the Related Art

Currently, cars, trucks, trains, ships, and aircraft are used to deliver payloads from one place to other. This method is expensive and requires good highway systems and expensive vehicles which limits the feasibility of delivering many types of freight. Aircraft use expensive fuel and have high capital costs. The author offers a new, revolutionary method and installations for cheaper delivery of payloads and people (1) from one place to another, (2) across streams, rivers, canyons, etc., (3) accelerating vehicles to desired velocity, (4) changing the trajectory of connected vehicles, and (5) cheaper vehicles which do not require their own engine. The method uses a closed-loop cable path with the propulsion system located on the ground; the concept can include airlines. The proposed system is unique with no references found for similar systems in the literature or other patents.

The current proposal describes a unique transportation system (with a transfer system) for delivering loads and energy from one place to another. The main problem is delivery of energy to a moving transportation vehicle. Weight of an electric wire often is more than the weight of a load bearing cable. The other problem is the engine, which with the onboard fuel requirements, significantly decreases the payload capabilities of the vehicle. These problems are minimized in the proposed Transportation System by locating a motor on the ground and using a conventional energy source (heat, electricity, mechanical energy, wind energy, and water power, etc. and any fuel: gasoline, oil, coal, or waste material) to provide the power for moving the transport vehicles to their destination. Moreover the suggested transportation system can transfer large amounts of energy from one place to another on Earth (about of 3 to 10 Millions watt).

This invention would not have been possible without the efforts and expertise of Mr. Glenn Gilyard, retired NASA scientist. The author wishes to acknowledge Mr. Gilyard's help in editing and correcting my English and for his advice.

BRIEF SUMMARY OF THE INVENTION

The method and facilities for movement of vehicles long distances are presented. The Method comprising the steps:

(a) connecting at least two main rollers: one in the port of departure and one in the port of arrival, by a series of closed-loop, light, strong cables (each referred to as a loop) located at least in one of following places: in the air, on the ground surface, on the water surface;

(b) supporting said cable with at least one of the following devices: wings, air balloons, columns, rollers;

(c) connecting at least one of said main rollers to an engine;

(d) running said engine;

(e) connecting at last one load vehicle to a point of said cable;

(f) delivering said vehicle in required point;

(g) accelerating said vehicle;

(h) disconnecting said vehicles from said cable;

(i) braking said vehicles.

An Installation using Method for movement of vehicles comprising: A set of rollers placed in the ports of departure, arrival, at points of direction change, and middle points; a light, strong, closed-loop cable (loops) connecting the ports of departure and arrival; engines placed near rollers and connected at least to one of said rollers; vehicles for transportation of people and loads; devices for connection and disconnection of the vehicles to the cable and placed on the vehicle.

The author also proposes 5 projects: an air bridge over the Straits of Gibraltar, Airline travel between city pairs of New York to Washington and New York to Paris, gas line for delivery of a natural gas, and a typical auto highway or city passenger delivery system.

Computations for these project show that the cable of some of them (for example, the Gibraltar Air Bridge and other Air Bridges, and ground vehicles) may be made from current industrial fibers. The long Airline pairs such as New York to Paris require stronger cable from whiskers, nanotubes or special cable design. The strong artificial material (fibers, filaments, whiskers, nanotubes) exists and has the ratio of tensile strength to density (specific gravity) up 2 million meters. For example, a whisker, with a ratio of 2.3 million meters, was created in early 1989 (the whisker, $C_D$, has a tensile strength of $H=8000$ kg/mm$^2$ and a density (specific gravity) of $D=3.5$ g/cm$^3$). The theoretical limit of tensile strength is 10 times more. The modern nanotube (for example, carbon nanotube CNT) has a tensile strength of 200 Giga Pascals (20000 kg/sq.mm) and specific density of 1.8–2.2 g/cc.

The estimations and computations show the possibility of making these projects a reality in a short period of time (see attached projects) and are affordable.

BRIEF DESCRIPTION OF THE SEVERAL VIEWS OF THE DRAWINGS

FIG. 1. Air bridge (side view).

FIG. 2. Air bridge (upper view).

FIG. 3. Terminals.

FIG. 4. Wing container (cabin) (side view).

FIG. 5. Wing container (front view).

FIG. 6. Wing container (top view).

FIG. 7. Loading to the wing container.

FIG. 8a. Support wing device (top view).

FIG. 11a. Airline transport system (side view) supported suspension system on columns.

FIG. 11b. Airline transport system (side view) supported by balloons (balloon suspension system).

FIG. 12. Airline transport system (front view)(view at AA) when suspension is to ground.

FIG. 13. Airline transport system (front view)(view at AA) when suspension is at a sea button.

FIG. 14. Sea (river) line and suspension system.

Connection of two additional branch systems to main system (change of lines).

Figure 20:
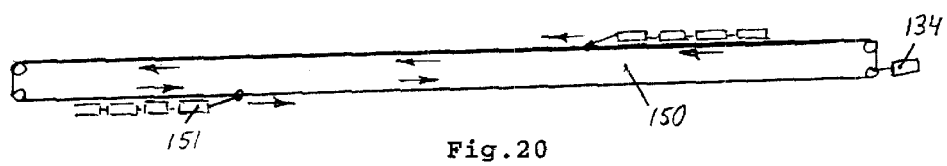

FIG. 20. The movement (transport) system for trains.

Figure 21A:
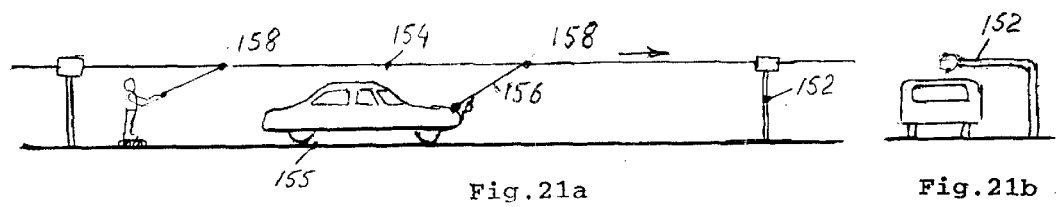
Figure 21B:
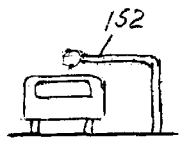

FIGS. 21a,b. Elevated cable suspension for ground movement system (side and front views).

Figure 22A:
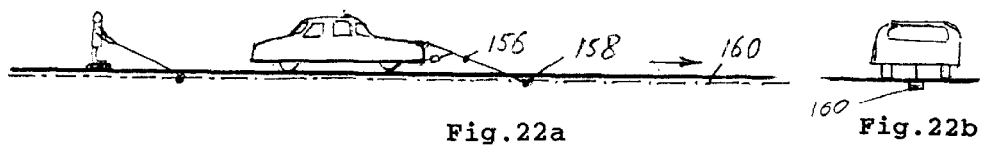

FIG. 22a. Underground cable suspension of the movement system (side view).

Figure 22B:
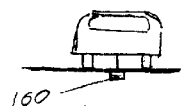

FIG. 22b. Underground cable suspension of the movement system (front view).

Figure 23A:
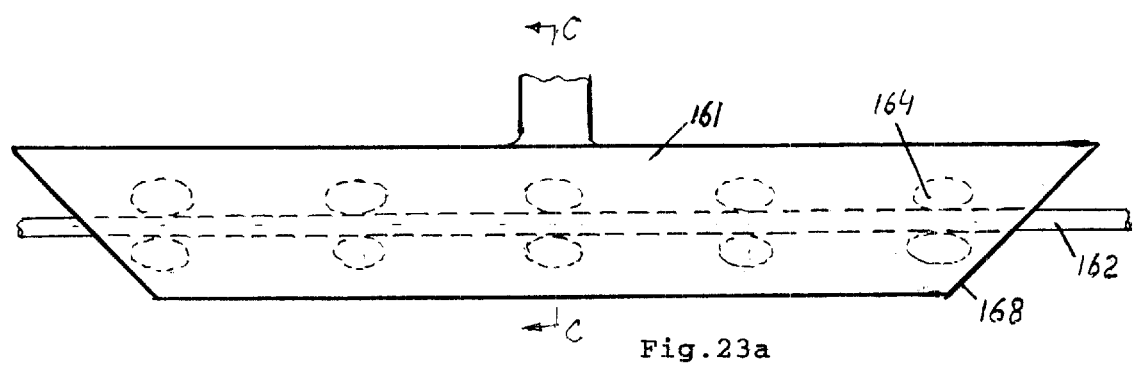

FIG. 23a. Support rollers (suspension device) of the suspension system with 4 rollers (side view).

Figure 23C:
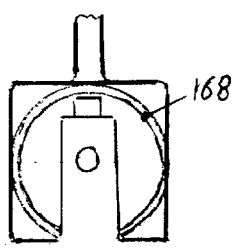
Figure 23D:
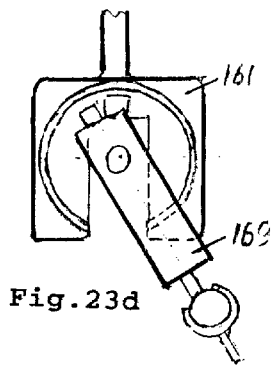
Figure 23E:
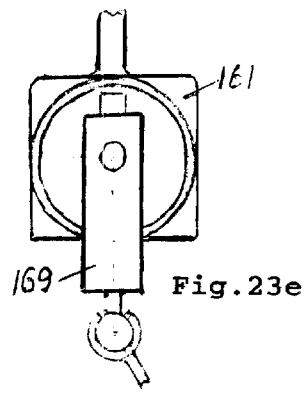
Figure 23B:
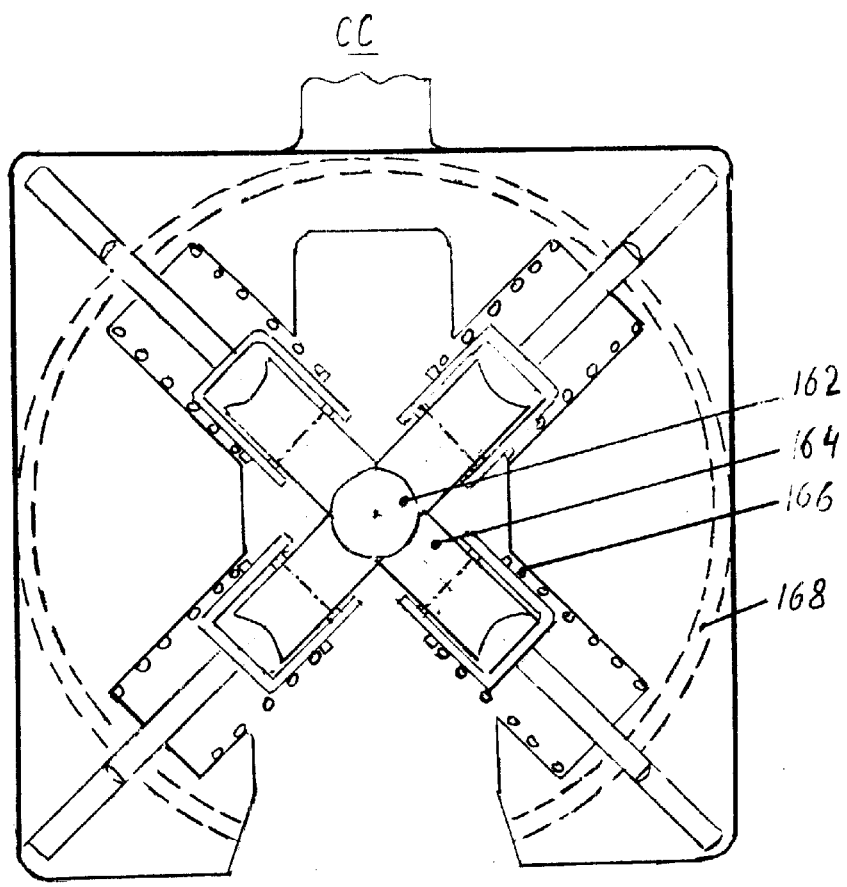

FIG. 23b. Cross section of the Support rollers of the suspension system with 4 rollers.

FIG. 23c. Front view of the suspension device.

FIG. 23d. An initial contact of the connection and suspension devices.

FIG. 23e. Position of the connection and suspension devices after sliding the connection devices along edge 168.

Figure 23F:
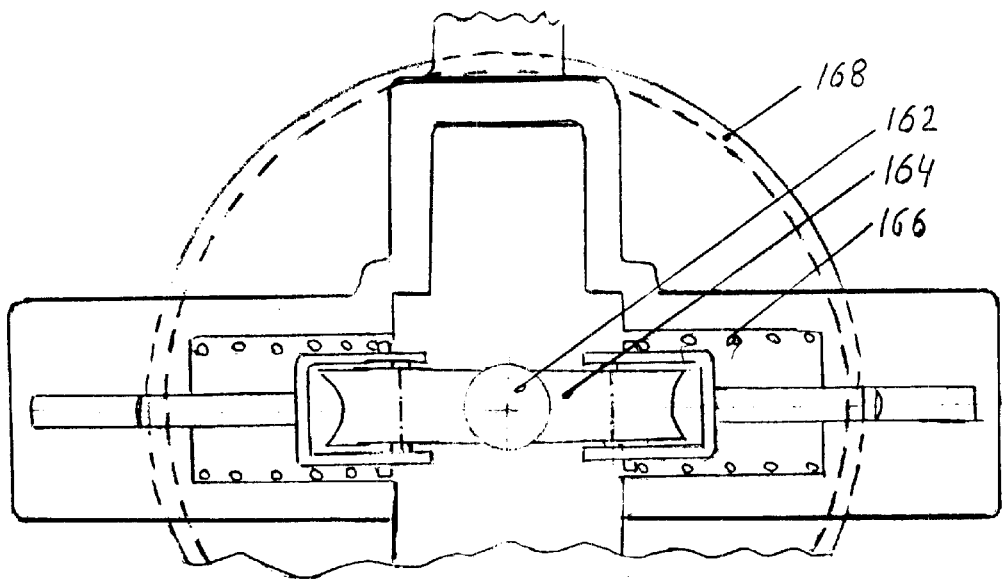

FIG. 23f. Cross section of the support rollers of the suspension system with 2 rollers.

Figure 24:
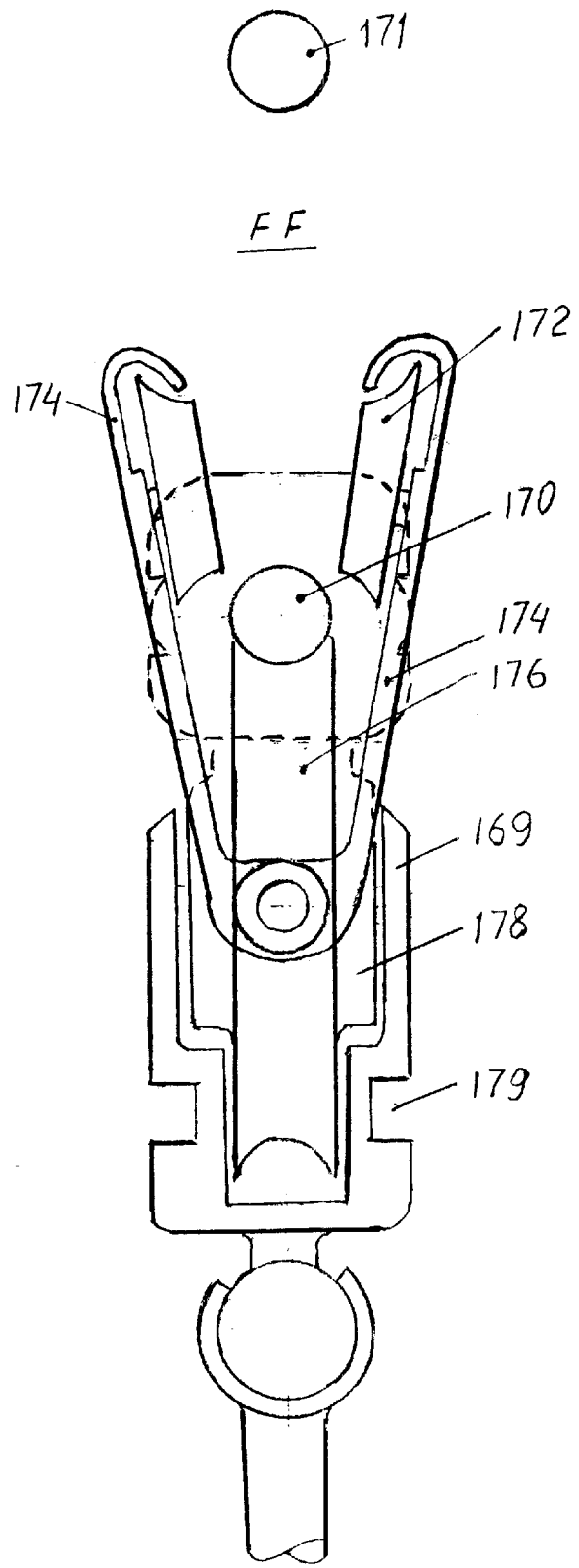

FIG. 24. Connection-disconnection device (for section FF FIG. 26).

Figure 25:
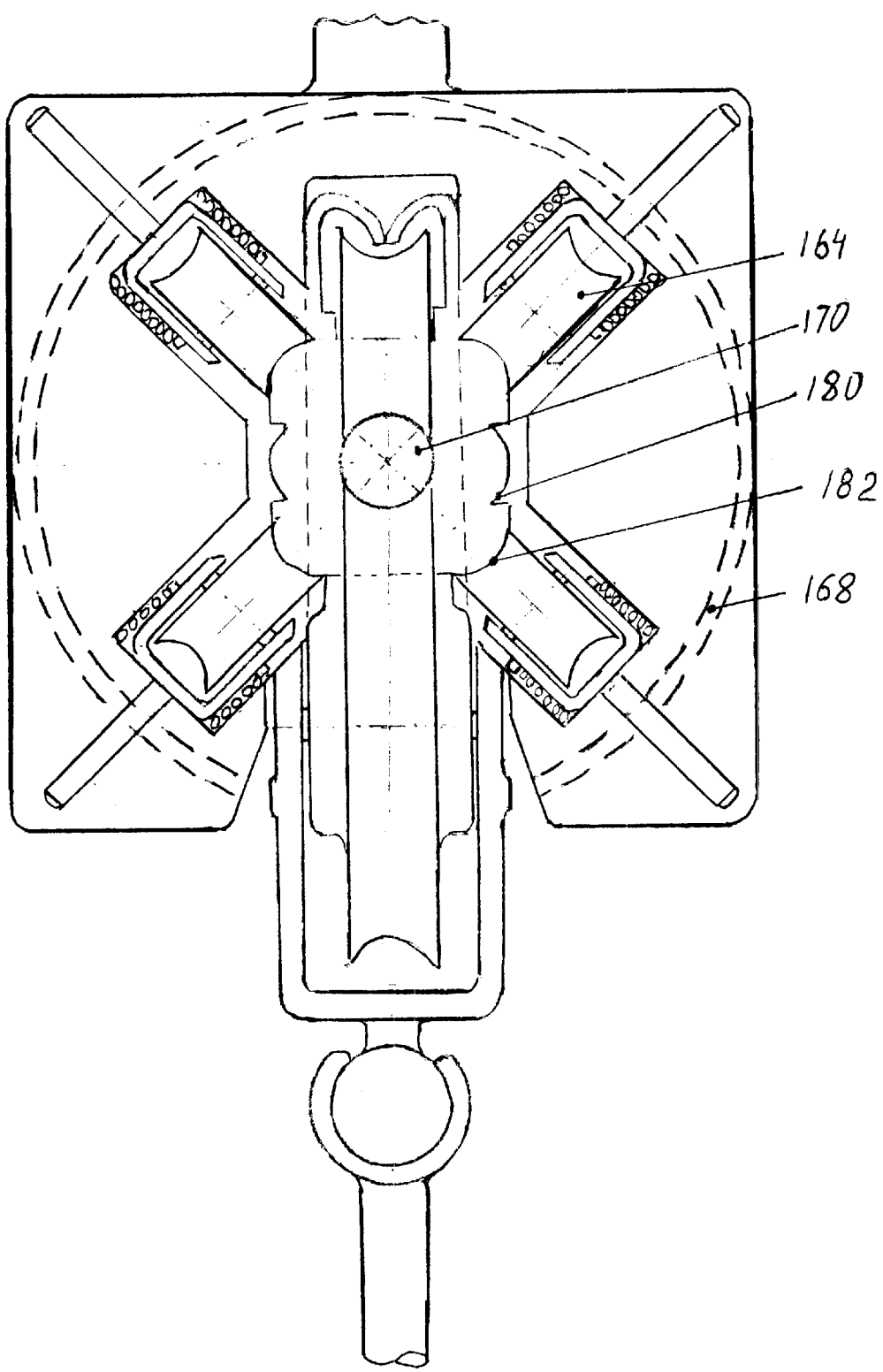

FIG. 25. Connection devices in a moment when that is moving throw the support rollers of the suspension system.

Figure 26:
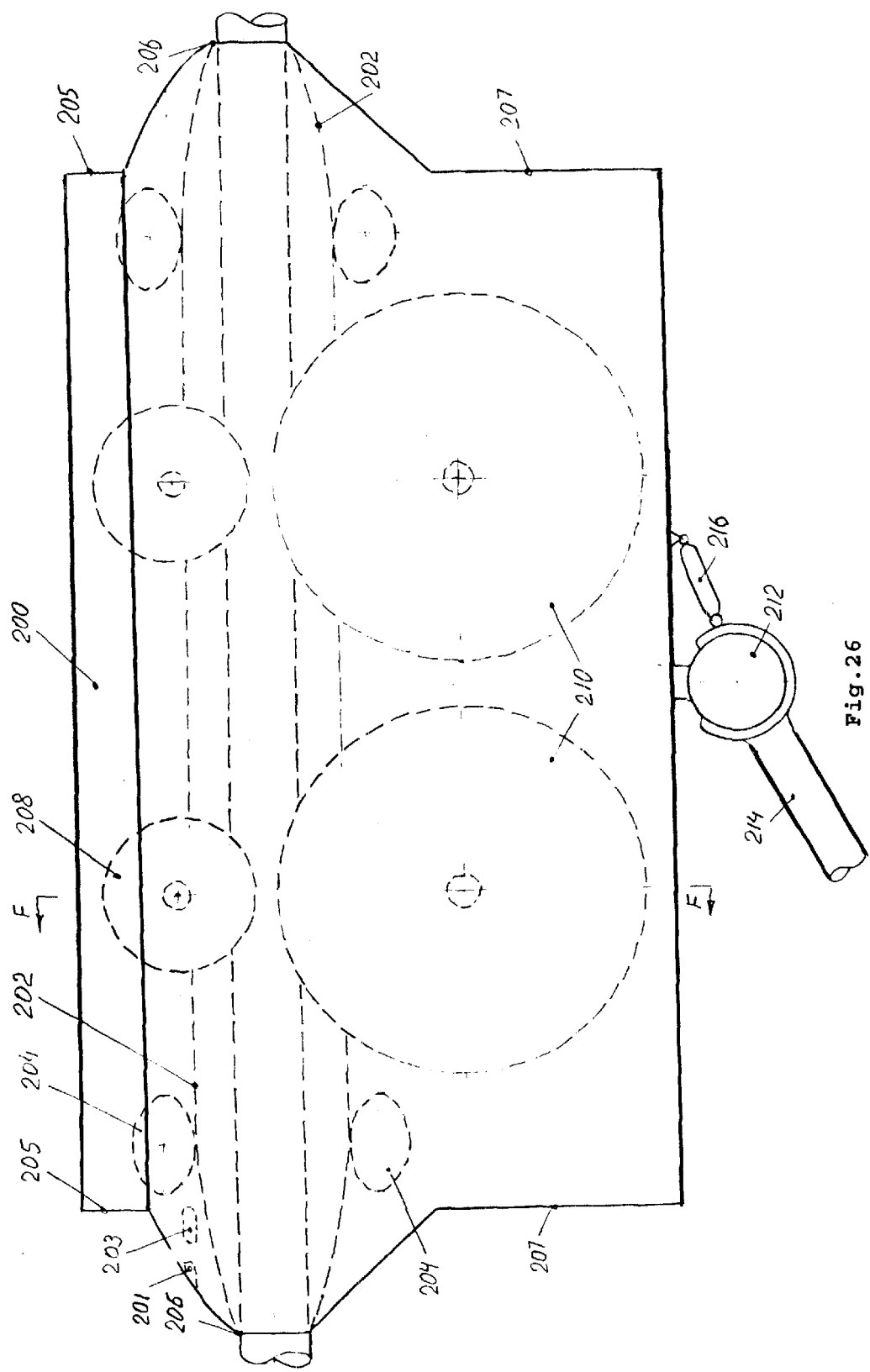

FIG. 26. The connection-disconnection device (Schematic side view).

Figure 27A:
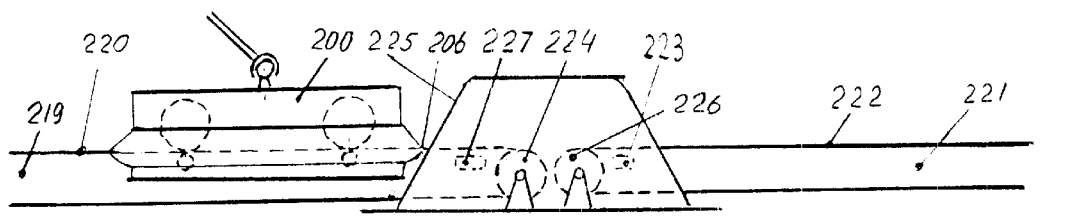

FIG. 27a. Link System. Scheme of the connection of the different movement systems (loops)(change of cable lines) (side view).

Figure 27B:
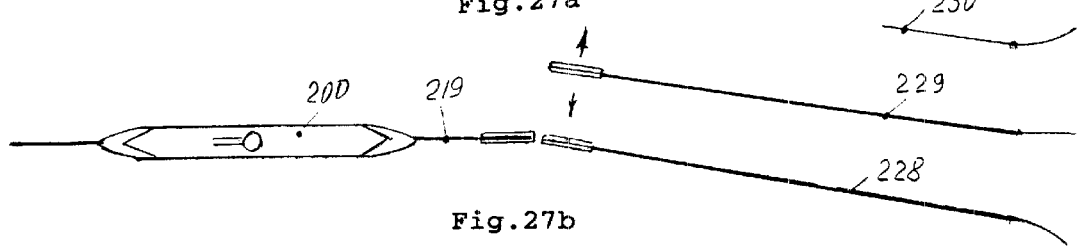

FIG. 27b. Link System. Schematic of the connection of the different movement systems (loops)(change of cable lines)(top view).

Figure 28A:
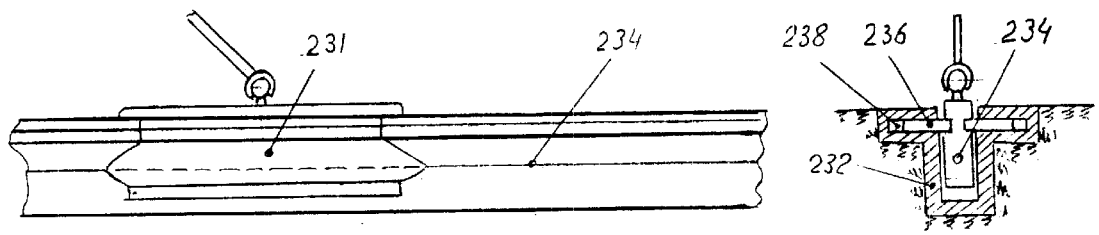
Figure 28C:
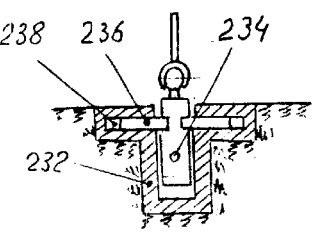

FIGS. 28a,b,c. Scheme (views) of the underground movement system.

Figure 29:
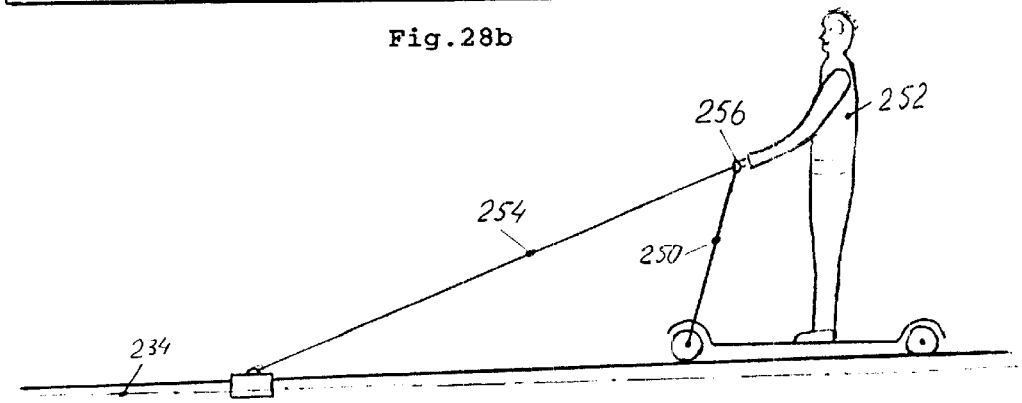

FIG. 29. A man on skateboard is connected to the transport system for movement.

Figure 30:
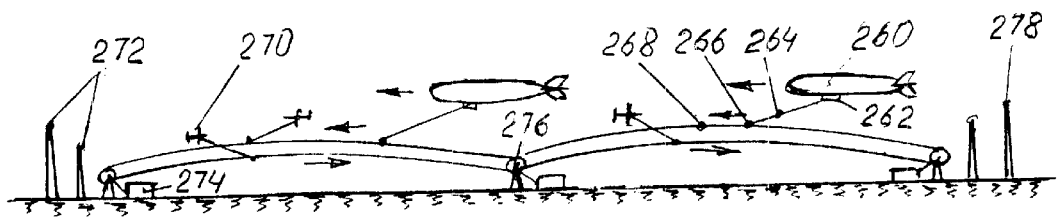

FIG. 30. Airlines used as a gas lines (set of cables and drive station).

Figure 31:
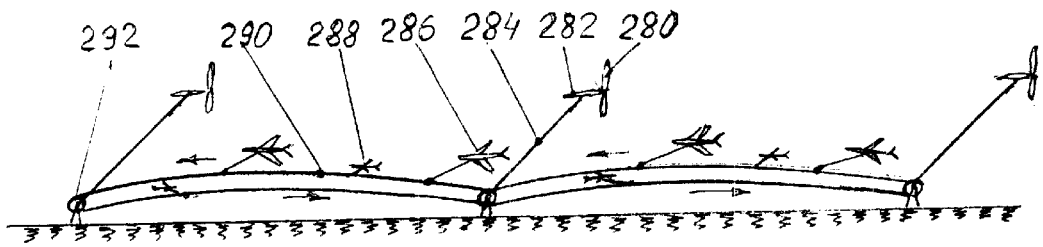

FIG. 31. Wind engines used for movement vehicles.

DETAILED DESCRIPTION OF THE INVENTION

Method

At the present time, all vehicles (cars, trucks, buses, trains, aircraft, airship, dirigible, sea ships) used for delivery payloads and people use engines located on the vehicle. These engines require expensive fuel (for example, gasoline). The vehicle must carry both the engine and the fuel which decreases the payload capability. For example, for aircraft flying long distances, the weight of fuel may reach from 30 to 40% of the takeoff weight, the engines weight is about 10% of the full weight of the vehicle. As a result the payload is decreased and consists of only 10–20% of the vehicle takeoff weight.

The proposed Method permits increasing the payload up to a maximum (no engine, nor fuel in the vehicle) and the use of the cheapest form of energy (such as liquid fuel, natural gas, wind-, or hydro-power stations).

The idea of the method is simple. Connect the vehicle to an engine located on the ground by a strong light cable. The problems appear when we want to cover a LONG distance (from one mile up to hundreds or thousands of miles), across a stream, river, sea, ocean, or heavily congested or industrial areas. How to suspend the cable (rope) in the air at high altitudes (5–11 km), over the stream, river, sea, or ocean is also a problem. For highways, the connection and disconnection of the vehicle (auto, car, truck, bus) at required locations along the route of a permanently moving cable is also a problem. For city transport systems (large numbers of routes and stops), the changing of lines and directions, and the organization of the delivery of a huge flow of different vehicles to many points also must be addressed.

These main problems are solved in this invention.

The important feature of this invention is the possibility of using existing autos (trucks, or buses), and aircraft for the suggested system after connection-disconnection devices are added to them.

Computations show a very strong and light cable (rope) for long distance movement (delivery, transportation) system (some hundreds and thousands miles) is required. Currently, industry is producing cheap fibers which have the required properties. We have also fibers, whiskers, experimental nanotubes, which have the required properties for application to the proposed ideas.

For distances more one hundred kilometers the light, strong, cable (rope) requires a ratio of tensile strength/ specific weight, of more than 200 km.

The objective of this invention is to provide for cheap delivery of payloads and people from one place to another. That may include delivery over a stream, river (flying bridge), airlines from one city to another, ferry-boats, a ground highway, or a city transportation system.

This goal is attained by the suggested Method and Installations.

The Method for movement of vehicles are comprised of steps:

connecting at last two main rollers displaced a long distance apart: one in a port of departure and one in a port of arrival, by a closed-loop, long, light weight, strong cable (loops) (rope) for any of the following systems: air (more than 10 meters above the ground), ground surface (on columns or in a ground groove), water surface (for example, river or sea platform);

supporting said cable by at least one of the following devices: wings, air balloons, columns, rollers;

connecting at least one of said main rollers to an engine;

running said engine;

connecting at least one vehicle for transport of payload or people at the departure point;

accelerating the vehicle;

delivering the vehicle in destination (required) point;

disconnecting the vehicles at the destination point;

braking said vehicles and removing from said cable (loop).

The method may further include at least one of the following steps:

- placing said ports a long distance apart (up to some hundreds kilometers);
- connecting said loops by links to a network having a set of different departure and arrival ports;
- running the cables; they can have different speeds in different loops of the network;
- using as the vehicles at least one of the following: conventional cars, buses, trucks, street cars (tram), roller skates, roller boards, water ships, airplanes, balloons, airships (dirigibles), gliders, and special wing containers, or wing cabins;
- accelerating the vehicle; it may be also made before connection them to the network;
- making the cables from light, strong material such as artificial fibers, filaments, composite material, whiskers, or nanotubes;
- using said Method for design of at least one of the following: long (air) bridges, air lines, gas lines, lines over water, ground transport lines. Reminder: Long distances include those equal to or more than one kilometer (0.6 mile). A light, strong cable having a ratio (tensile strength to specific density) equal to or more than 0.05 millions meters, and a tensile strength of more than 100 kg/sq.mm.

Installation

An example installation is shown on FIG. 1 (side view). This is an air bridge over a sea strait, stream, or channel, for example, the Straits of Gibraltar (16 km). The installation includes the terminals 1 (departure and arrival), a light, strong closed-loop (main) cable (loop, rope, chain) 4 over the water 2 (in both directions), a wing container (wing cabin) 6 for payload and people, a support wing device 8 (suspension, support system). The direction of flight of the wing container is indicated by 10. The FIG. 2 show the upper (top) view of this installation.

FIG. 3 shows the terminal (departure and arrival ports). The departure terminal (port) 12 has a starting (acceleration) station (system) 13, takeoff runway, arrival (braking) station (system) 14, starting (acceleration) closed loop cable (loop, rope) 16, starting rollers 18, starting engine (engine of the starting system) 20, starting connection-disconnection sliding device 22 (connected to a starting cable 16 and to the wing container 6), main connection-disconnection sliding devices 24 (connected to the main cable 4 and to the wing container 6), landing runway 26, platform for arriving wing containers (unloading station) 28, platform for departing wing containers (loading station) 30. The terminals also have the rollers 32 for the main cable 4 and an engine station 34 of the main cable. The engine (drive) station 34 includes engines, storage of energy (energy storage system)(for example, inertial flywheel), transmission, clutches, brake, control system, and an energy transfer system.

On FIGS. 4–6 are shown the three views of the wing container (the wing cabin) which includes the following parts: FIG. 4 shows a wing container (cabin) (side view): 40—wing container; FIG. 5 shows the wing container (front view); FIG. 6 shows the wing container (top view): 42—wing; 44—flaps; 46—ailerons; 48—tail (stabilizer, fin, control system): 49—elevator. FIG. 7 shows loading of the wing container. A quick loading system is shown on FIG. 9. In this last case, the payload 64, including people, are loaded on the platform 60 having rollers 62; the platform is inserted (rolled) into the wing container. The inserting (removing) of platform into (from) the wing container takes a few minutes (loading and unloading system).

On FIGS. 8a,b,c are shown support devices of the main cable (flight device of a suspension system). That is a wing 52, flaps 51, beam 50, tail 54 (stabilizer, fin, elevator 53), a wing cable 56, and control system. These devices are connected to the main cable 4. The devices create a lift force, when the main cable is moved, and support it at altitude.

Figure 10A:
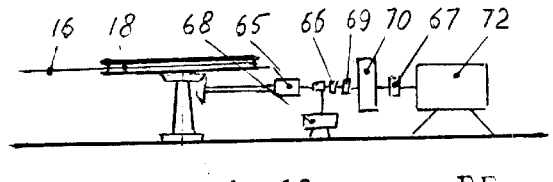
FIG. 10a. Drive System (Drive Station).

The engine 20 of the starting (accelerating, driving) system 13 is shown with more details on FIG. 10a. The system includes: 65,66,67—clutches 68—brake; 69—variable transmission; 70—accumulator of energy (it may be inertia wheel, flywheel); 72—motor. The drive stations have a same parts.

Figure 10B:
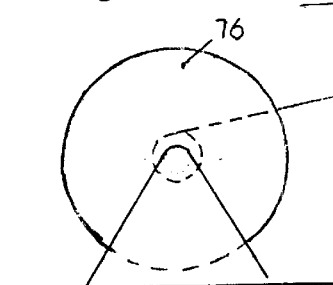
FIGS. 10b,c. Variable (tape) transmission (b—side view, c—front view).

FIGS. 10b,c show a new type of variable transmission: 74—body; 76,77—drums; 78—strong tape; 79—clutch. This transmission allows a smooth change of the revolution speed of a transmitter shaft and transmission of the forces. It is required since the inertia flywheel changes the revolution speed and the acceleration system has a variable speed main cable.

This installation works the following way (FIG. 3). The engine, 20, moves the closed-loop starting cable (loop, rope, chain) 16 and the engine 34 moves the primary closed-loop main cable 4. The payload (cars, trucks) and people arrive to port 1. They are loaded to the platform 60 (FIGS. 9,7) and rolled to wing containers 40 (FIG 6). The wing container 40 is connected to the starting cable 16 via the connection device, 22, and the connection device 24 is connected to the main cable 4 (FIG. 3). The sliding connection 22 connects to the moving cable 16 and the engine system 20 accelerates the wing container 6 to a velocity when the wing 42 can keep the container in air. At the end of the takeoff segment of flight, the container is disconnected from the starting cable 16 and transfers connection of the container 6 by device 24 to the main cable 4. The container fly's over the water 2 and lands at the arriving port 14. Here it is disconnected from the main cable, and brakes on the landing runway 26. It moves to the platform, 28, where it is unloaded, and is moved to the platform 30 for the next loading and flight. The delivery in opposite direction is same.

FIGS. 11–13 show the suspension (support) system of the main cable via the columns and air balloons. This system is more suitable for Airlines. The system includes:

FIGS. 11a,b. Airline transport system (side view): 80—main closed-loop cable; 81—column; 82—support balloon cable; 83—sag of main cable; 84—support balloon; 86—suspension of cable to the support balloon; 88—wing container (wing cabin); 90,92—terminals; 94,95—engine of drive station for motion of the main cable.

FIG. 12. Airline transport system (front view)(view at AA) when the suspension is on land: 96—connection to the ground.

FIG. 13. Airline transport system (front view)(view at AA) when the suspension is to the sea bottom: 97—connection to the sea bottom.

The operation of the Airline transport system is the same as described for the Air Bridge. The loads and passengers arrive to departure port 90. They are loaded on the wing container, and fly to the arrival port 92. The return trip is the same.

FIG. 14 shows the River (or Sea) Line: 98—suspension of the main cable via a floating platform, 99—river ship.

Figure 15:
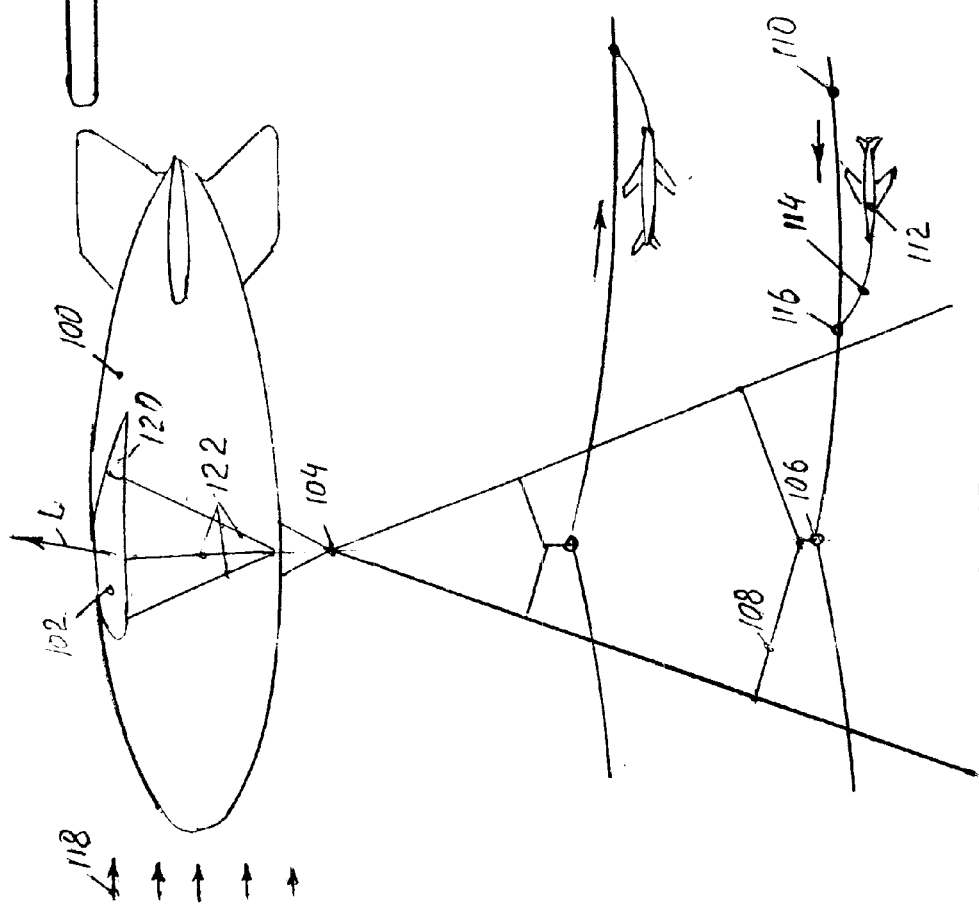
FIG. 15. Suspension of the main cable by air-wing balloons (side view)(suspension system used air-wing balloons).

FIG. 15 shows the suspension of the main cable via air-wing balloons (balloon suspension system)(side view): 100—balloon; 102—an inflatable balloon wing; 104—rotation connector; 106—connection devices; 108—cable suspension of a return line; 110—main cable; 112—wing container; 114—container cable; 116—connection device for wing container; 118—wind; 120—wing flaps; 122—wing support cables.

Figure 16:
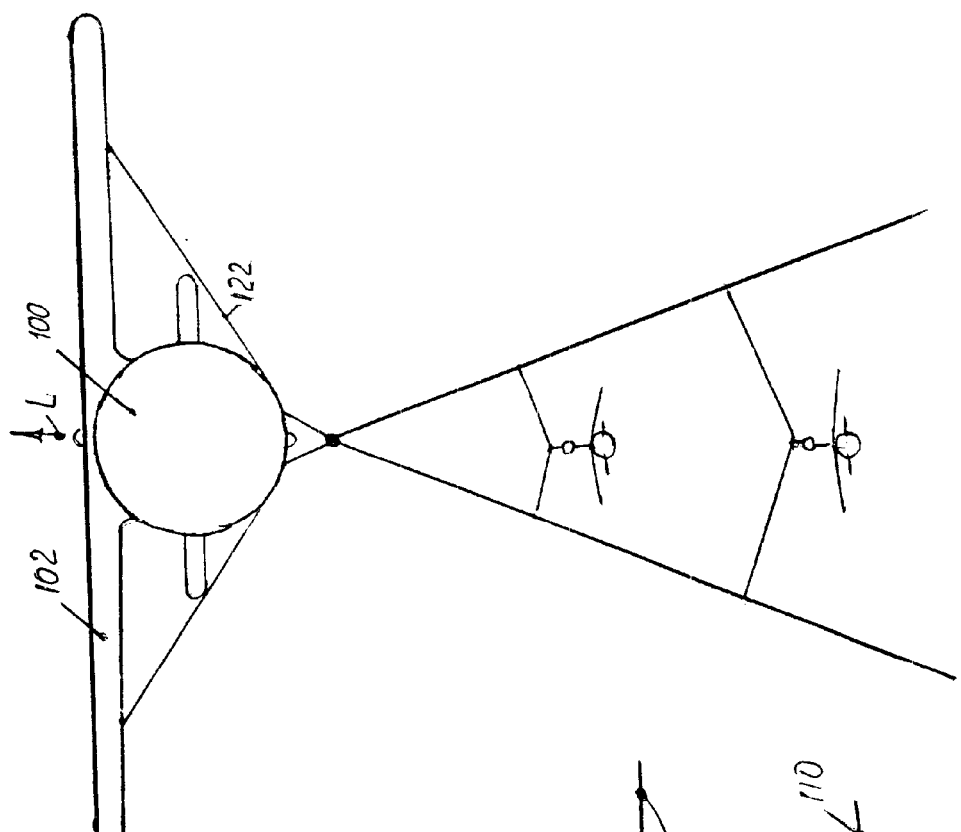
FIG. 16. Suspension of the main cable by air-wing balloons(front view).

This suspension system has an additional lift force from the wind, which permanently blows at high altitude and the balloons can be smaller, cheaper, and the flight can occur at greater altitude. FIG. 16 shows the suspension of the main cable via air-wing balloons (front view).

Figure 17:
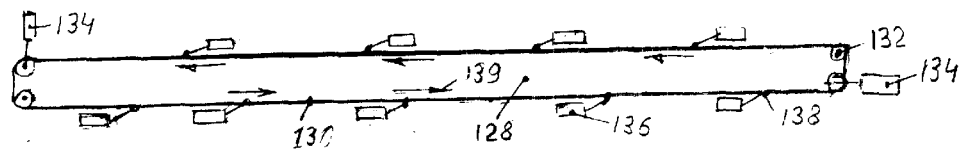
FIG. 17. Ground movement system for auto, car, track, train, and other ground vehicles.

FIGS. 17–20, 21*a,b*, 22*a,b* show the ground movement system (set, network of main closed-loop cables). This system is suitable for highways and a city internal delivery system. This system includes the following components:

FIG. 17. Ground movement system for auto, car, bus, truck, train, and other ground vehicles: 128—movement (transportation) system for ground vehicles; 130—main cable; 132—rollers; 134—engine; 136—vehicle; 138—connection device; 139—direction of motion.

Figure 18:
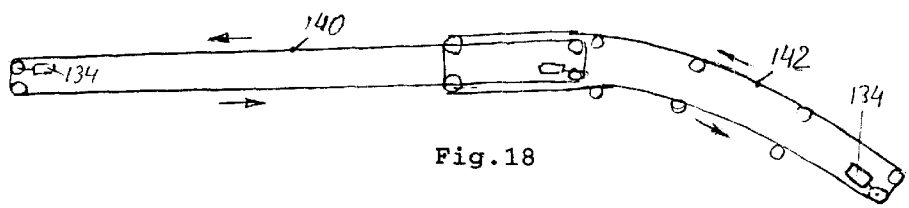
FIG. 18. Connection of two ground movement systems.
Figure 19:
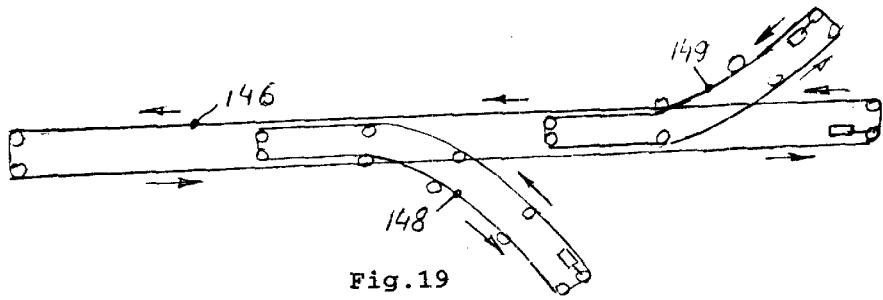
FIG. 19. Set (network) of cables (loops) and drive stations.

FIG. 18. Connection two of ground movement systems: 140—the first system; 142—the second system;

FIG. 19. Connection two additional branch systems to main system: 146—main system; 148,149—additional branch systems.

FIG. 20. The movement (transport) system for trains: 150—movement system; 151—train.

FIGS. 21*a,b* (side and front views). Air (upper) cable suspension of the movement system on ground surface: 152—column; 154—main cable; 155—vehicle (for example, conventional car or truck via the connection devices and rod); 156—connection bar (rod); 158—connection-disconnection device.

FIGS. 22*a,b*. Underground (lower) cable suspension of the movement system on ground surface (side and front views): 160—underground main cable.

FIGS. 23*a–e* shows schematically, the support rollers of the suspension system: 161—suspension device; 162—main cable; 164—roller of the suspension system; 166—spring of the roller; 168—guides, front edge of the suspension devices. The guide rotates (FIGS. 23*c,d,e*) the connection device 169 (FIG. 24) to the right (vertical) position (FIGS. 23*c–e*,25). This design allows passing of the connection device across the suspension device as shown on FIGS. 25,23*e*.

FIG. 23*f* shows an alternate design of the suspension device which has only two support rollers.

FIG. 24 shows schematically the connection-disconnection device (for the section FF of the FIG. 26): 169—connection-disconnection device; 170, 171—main cable; 172—upper roller; 174—catcher (lever) of the upper roller; 176—lower roller; 178—brake of the lower roller, 179—groove for a cover (plate) 236 (FIG. 28*a*). This devices also has a control system for the connection and disconnection of the device to the main cable of the transportation system. The control system includes an electric source, wires, solenoids, and lock.

FIG. 25 shows the connection devices in the transportation system when it is moving through the support rollers 164 of the suspension system along the path 182.

FIG. 26 schematically shows the section view of the connection-disconnection device (side view): 200—connection-disconnection device; 201—groove for opening the connection device; 202 (182 on FIG. 25)—guide for the support cable roller; 203—lock of rollers (levers 174); 204—rollers of the support devices (164 on FIG. 23); 205—top edge of the connection device; 206—front edge of the connection device; 207—lower edge of the connection device; 208—upper rollers of connection device; 210—lower rollers of connection device; 212—connection to the rod; 214—rod; 216—control device for positioning of the connection device.

The connection device of ground system works in the following way (FIG. 24). The catcher 174 is opened by the control system. The device is moved to the main cable 171 and, when the cable is placed in the position 170, the lever 174 is closed and catches (grips or squeezes) the cable 170 between the rollers 172, 176 which rotate free. The friction disks of the transmission (brake) 178 are then gradually gripped by control system. The connection device increases the tow force, accelerates the vehicle, and connects the vehicle to the cable 174. The rollers 176,172 are stopped and locked.

When disconnection is required from the movement system, a signal is given, the control system opens the lock, the levers (catcher) 174 and device are disconnected from the cable 170.

FIG. 27*a* shows a link system. That is a scheme of the connection of the different movement systems (the cable lines) (side view). Notations: 219, 221—lines of the movement systems; 220,222—transport cables of two movement systems 219, 221; 223—key (bulge, boss, cog), which closes the level 174 (FIG. 24); 224, 226—rollers; 225—the surface, which turns the connection device in the vertical direction if needed (compare 169 with FIG. 23*a*); 227—key (bulge, boss, cog), which moves apart the level 174 (FIG. 24) and allows rollers to pass 224,226.

FIG. 27*b* shows a scheme of the connection of the different movement systems (the change of cable lines)(top view). Notations: 228, 229, 230—different lines (different directions) of the movement network.

FIGS. 28*a,b,c* show a scheme of the underground movement system. Notations: 231—connection device; 232—body of the underground groove for transport cable; 234—transport (main) cable; 236—sliding plate (cover) of the cable groove; 238—spring; 240—bevel of the sliding plate (cover); 242—edge of the connection device whereby the cover is opened; 244—bulges on the upper surface of the cover for an initial opening the plate by the edge 242.

The connection of two lines works in the following way (FIG. 27*a*). One of the lines 228, 229, or 230 is connected to the line 219. The key 227 contacts with the groove 201 and the lock and lever 174 are opened, the connection device 200 pass the rollers 224, 226, and the device 200 is automatically connected to the cable 222 of the next line 228 (221).

Figure 28B:
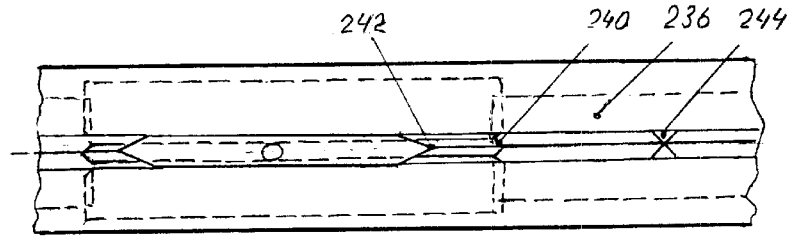

The underground movement system works in the following way. The front edge 205, of the connection device 200, contacts the key 244 and initially opens the sliding plate (cover) 236 of the cable groove 232 (FIGS. 28*b,c*). After connection with the cable 234, the connection device opens (moves apart) the cover plates 236 by the front edge 207 when contact with the bevel 240 (FIG. 28*b*) of the cover plates 236 is made. After passing the device, the spring 238 closes the covers 236.

FIG. 29 shows a man on a skateboard who is connected to the transport system for movement. Notation is: 250—skateboard; 252—man; 254—connection rod; 256—control.

The ground system works in the following way. The vehicle (for example, the conventional cars, bus, or truck is equipped the connection devices), or a man on roller skates connects to the transport system by the connection device and is accelerated. They can change lines, direction, or speed, and can connect to branch lines to reach the desired destination. Here the vehicle (man on roller skates) is disconnected and braked. A conventional truck or car can be accelerated by their own engine up to the system speed and connected to the transportation system. If a vehicle does not have its own engine, the vehicle can be accelerated by another vehicle or at a special accelerating station.

The suspension system and the connection devices work in the following way: The suspension system supports the cable 162 by the rollers 164 (FIG 23a). These rollers allow to change direction of the main cable. These rollers are connected to a spring 166 (FIG. 23b) and roller lock (not shown).

When the connection devices 200 come up to the suspension devises, one opens (by the front edge 206 of the roller lock), frees the rollers 164, moves apart the rollers, and passes the rollers across the suspension devices along the cable (see FIG. 25). After passing the connection device the spring returns the rollers to their permanent position and closes the roller lock. The suspension rollers are opened as required and the main cable does not loose contact with the suspension device.

The connection devices (FIG. 24) of airline work in the following way: the device with open upper rollers 172, connects to main cable at any place. When the main cable is in position 170, the levers (catchers) 174 are closed, and the rollers 176, 172 begin to rotate. The cable slides freely across the connection device. When friction in the friction clutch is increased 178, the main cable begins to pull the connection device and accelerates the connected vehicle. When the vehicle reaches the cable speed the connection device catches the main cable and sliding is stopped. Disconnection is made by the conventional method; the lever (catcher) 174 are opened and the device disconnects from the cable.

The suggested movement system has large advantages in comparison with the current systems of bridges, underground tunnels, Airlines, and delivery by conventional cars and trucks.

The suggested Air Bridge as compared with a conventional Bridge or underground tunnel.

1. The suggested Air Bridge is cheaper than a conventional bridge or especially an underground (underwater) tunnel by hundreds of times (for long bridges-by thousands times). The cost decreases from some billions of dollars to some tens of millions of dollars.

2. Air Bridge can be made in a few months. The bridge or tunnel requires years for construction.

3. The cost of an Air Bridge does not increase as its length increases (length increases only length of ropes). The cost a conventional bridge or tunnel increases more quickly as its length increases.

4. The Air Bridge can be built in places where it is impossible to build a bridge or tunnel by modern technology (for example, across the Bering Straits between the continents of Asia and North America (between Russia and the USA).

5. The transit time (time of delivering) is decreased by tens of times.

6. The toll fee for using an Air Bridge will be lower and/or decrease more rapidly due to lower overall construction costs.

Airlines

1. Aircraft are very expensive. The suggested Airlines system does not use conventional aircraft. They use a cheap wing container or cabin without engines and expensive electronic equipment for navigation and communication.

2. Aviation fuel is expensive. The Airline system proposed can use any sort of energy such as wind, water, nuclear or fuels such as natural gas, coal, peat, etc., because the engine located on the Earth's surface. The cheapest energy can be used.

3. It is not necessary to have a highly qualified personal such as pilots with their high salaries.

4. The fare for the flight will be much lower.

Surface Transport (Movement) System

1. Very simple and cheap vehicles can be used for passenger and payload transportation by the suggested transportation system. It may be a simple (no engine) box or platform with wheels, a roller board or roller skaters. It can also be a conventional car, bus, or truck. The vehicle must only have (or be equipped with) the sliding connection device.

2. The system does not produce pollution of the environment on highways nor, especially, in large cities.

3. The system does not use expensive liquid fuels (gasoline or diesel). It may use the wind, water or any cheap energy.

4. The delivery can be made without a conventional vehicle (for example, men on the roller skates).

5. It can use as vehicles cars, buses, trucks, trains, ships, and aircraft, and can utilize old vehicles, with their engine turned off to prolong the life of the old vehicle, who's engine may be outdated.

6. It decreases car accidents because the vehicles move sequentially and cannot pass one other.

FIG. 30 shows airlines used as a gas lines. The Notations are: 260—air balloon (dirigible, airship); 262—payload; 264—balloon connection cable; 266—connection device; 268—main closed-loop cable (loop, rope); 270—fly apparatus (support wings) for a return of the packed balloons and a support of the main cable (rope); 272—a mooring mast of an arrival port for pumping off a gas from balloons and for unload of payload; 274—engine of drive station; 276—link device of the loops; 278—mooring mast of the departure port for pumping gas to balloons (dirigible, airship).

The gas line works in the following way. In the departure port 278 the natural gas (methane) is pumped into air balloons 260 and the payload is loaded to the load cabin 262. The balloon is connected by the balloon cable 264 and the connection device 266 to the main cable (loop) 268 and moved to the arrival port 272. Here the payload is unloaded, the gas is pumped out from the balloon into a gas storage, the balloon is packed to a small volume. The packed balloon is loaded to the fly apparatus (the support wing) 270. The fly apparatus is connected to the main cable (loop) 268 and departure back to the starting port 278. If load capability (lift force) of the wing is more than the packed balloon weight, the wing (fly apparatus) 270 is able to delivery a load from the arrival port to the departure port.

Advantages of a Air Gas Line as Compared with a Conventional Ground Gas Pipeline 1. The suggested air gas line is cheaper than the conventional ground gas pipeline by hundreds of times. The cost decrease from some billions of dollars to some tens millions of dollars.

2. Air gas line can be made in few months. The conventional ground pipeline requires some years for building.

3. No damage of an environment.

4. Very high load capability. The line can delivery gaseous, liquid, and sold payloads.

5. Impossible to steal the gas when the pipeline across the territory of a third country.

6. It is easy to change a direction (a way) of line, when appear a conflict with country whose territory is used (across) by gas line.

FIG. 31 shows wind engines used for movement vehicles. Notation are: 280—wind engine (propeller); 282—wing which support the wind engine at an altitude; 284—cable transmission of energy (transfer energy system) from the wind engine to the drive station; 286—aircraft; 288—support cable wing; 290—main cable; 292—drive station.

The installation works the following way. The wind engine (propeller) 280 flights at a high altitude, where there are a strong wind. The wind engine is supported by the support wing 282. The energy transfers by the cable transmission (energy transfer) 284 from the wind engine 280 to the drive station 292 and to the main cable 290. The main cable (rope) moves the aircraft 286.

The engine can further includes the dear box (transmission), clutches, energy storage, etc.

We summarize said main evidences (species) of the Installation used said Method:

1. An Installation using Method for movement of vehicles comprising:

a set (network) of departure and arrival ports (places for connection of vehicles);

a set of rollers placed at said ports of departure and arrival, at points of direction change, and at middle points;

a set of light, strong, closed-loop main cables (loops, ropes, chains) connected whereby links, which form network connecting said ports of departure and arrival;

engines placed near rollers and connected to at least one of said rollers;

vehicles for transportation of people and payloads;

devices for connection and disconnection of said vehicles to said cable and placed on said vehicles;

control system located on said connection devices whereby a driver can connect and disconnect said vehicle from said cable.

2. The Installation, as recited in point 1, further includes at least one of the following systems:

a set (network) of said cable loops connected sequentially one to another;

link connection system, which connects said cables (loops);

accelerating system located in said ports whereby said vehicles are accelerated;

braking system located in said vehicles whereby said vehicles are braked;

loading system located in said ports for fast loading and unloading of said vehicles;

suspension (support) system located along said cables (loops) whereby said cables are supported;

energy storage system;

said network (loop network) are placed on the Earth surface and includes extending into the atmosphere;

said vehicles include at least one of the following vehicles: conventional cars, buses, trucks, street cars, trains, roller skates, roller boards, ships, conventional gliders, aircraft, balloons, airship, dirigibles, wing dirigibles, special wing containers, and wing cabins;

drive stations located on Earth's surface and connected to said main cable for movement of said vehicles whereby said main cable;

wind engines located at altitude and connected to said drive stations whereby a cable transmission.

3. The Installation as recited in point 2 further includes at least one of the following suspension (support) systems and devices:

high altitude atmospheric suspension system in which said cables are placed in the atmosphere, except ends, and supported by at least one of the following suspension devices:

(a) air support balloons connected to the earth's surface by support cables (ropes, wires);

(b) air support balloons having wings and connected to the earth's surface by support cables;

(c) support wing devices connected to said main cable;

air suspension system located on columns placed along said cables on ground or water surfaces;

ground suspension system located in a groove of ground surface; all said suspension systems above have support devices connected to said cable and to said suspension system.

Most engineers and scientists think it is impossible to develop an inexpensive transportation system using a long cable system. Twenty years ago, the mass of the required cable would not allow this proposal to be possible. However, today's industry widely produces artificial fibers, which have tensile strengths 3–5 times more than steel and densities 4–5 times less then steel. There are experimental fibers which have tensile strengths 30–100 times more than a steel and densities 2 to 5 times less than steel. For example, in the book "*Advanced Fibers and Composites*", by author Francis S. Galasso, Gordon and Branch Science Publisher, 1989, p.158, there is a fiber (whisker) $C_D$, which has a tensile strength of H=8000 kg/mm$^2$ and density (specific gravity) of D=3.5 g/cm$^3$. If we take an estimated strength of 7000 kg/mm$^2$ (H=7×10$^{10}$ n/m$^2$, D=3500 kg/m$^3$), then the ratio is D/H=0.05×10$^{-6}$ or H/D=20×10$^6$. This value is used in some projects defined below. If, after 12 years since this information was published, the ratio, D/H, has decreased by a factor of two (up to D/H=0.025×10$^{-6}$), the load capability in projects increases or the cable mass decreases. Although the described (1976) graphite fibers are strong (H/D=10×10$^6$), they are at best still ten times weaker than theory predicts. The steel fiber has a tensile strength of 5000 MPA (500 kg/sq.mm), the theoretical limit is 22,000 MPA (1987); the polyethylene fiber has a tensile strength 20,000 MPA, the theoretical limit is 35,000 MPA (1987).

Apart from unique electronic properties, the mechanical behavior of nanotubes also has provided excitement because nanotubes are seen as the ultimate carbon fiber, which can be used as reinforcements in advanced composite technology. Early theoretical work and recent experiments on individual nanotubes (mostly MWNT's) have confirmed that nanotubes are one of the stiffest materials ever made. Whereas carbon-carbon covalent bonds are one of the strongest in nature, a structure based on a perfect arrangement of these bonds oriented along the axis of nanotubes would produce an exceedingly strong material. Traditional carbon fibers show high strength and stiffness, but fall far short of the theoretical, in-plane strength of graphite layers (an order of magnitude lower). Nanotubes come close to being the best fiber that can be made from graphite structure.

For example, whiskers from Carbon nanotube (CNT) have a tensile strength of 200 Giga-Pascals and a Young's modulus over 1 Tera Pascals (1999). The theory predicts 1 Tera Pascals and a Young's modules of 1–5 Tera Pascals. The hollow structure of nanotubes makes them very light (the specific density varies from 0.8 g/cc for SWNT's up to 1.8 g/cc for MWNT's, compared to 2.26 g/cc for graphite or 7.8 g/cc for steel).

Specific strength (strength/density) is important in the design of our transportation system; nanotubes have values at least 2 orders of magnitude greater than steel. Traditional carbon fibers have a specific strength 40 times that of steel. Since nanotubes are made of graphitic carbon, they have good resistance to chemical attack and have high thermal stability. Oxidation studies have shown that the onset of oxidation shifts by about 100° C. to higher temperatures in nanotubes compared to high modulus graphite fibers. In a vacuum, or reducing atmospheres, nanotube structures will be stable to any practical service temperature.

The fibers is cheap. They are widely used in tires and everywhere. The price of SiC whiskers produced by Carborundum Co. with σ=20,690 Mpa and γ=3.22 g/cc were $440/kg in 1989. The market price of nanotubes is also too high presently (~$200 per gram) (2000). In the last 2–3 years, there have been several companies that were set up in the US to produce and market nanotubes. It is hoped in the next few years nanotubes will be available to consumers for less than US $100/pound.

Below, the author provides a brief overview of recent research information regarding the proposed experimental (tested) fibers. In addition, the author has also solved additional problems, which appear in these projects and which can appear as difficult as the proposed ground or space transportation technology itself. The author is prepared to discuss the problems with serious organizations which are interested in researching and developing related projects.

Data Which Can Be Used for Computation

Let us to consider the following experimental and industrial fibers, whiskers, and tubes:

1. Experimental nanotube CNT (Carbon nanotube) has a tensile strength of 200 Giga-Pascals (20000 kg./sq.mm), Young's modules is over 1 Tera Pascal, specific density γ=1800 kg/m³ (1.8 g/cc) (year 2000).

For a safety factor, let n=2.4, σ=8300 kg/mm²=8.3×10¹⁰ n/m², and γ=1800 kg/m³, (σ/γ)=46×10⁶. The nanotube SWNT's has a density of 0.8 g/cc, the nanotube MWNT's has a density of 1.8 g/cc. Unfortunately, the nanotube is very expensive at the present time (1994).

2. Whiskers $C_D$ have σ=8000 kg/mm² and γ=3500 kg/m³ (1989). The computations assume σ=7000 kg/mm², γ=3500 kg/m³, and σ/γ=20×10⁶.

3. Industrial fibers with σ=500 kg/mm², γ=1800 kg/m³, and σ/γ=2,78×10⁶ are also used.

Some other experimental whiskers and industrial fibers are presented in Table #1.

TABLE 1

| Material Whiskers | Tensile of strength kg/mm² or GPa | Density g/cc | Fibers | MPa | Density g/cc |
|---|---|---|---|---|---|
| AlB₁₂ | 2650 | 2.6 | QC-8805 | 6200 | 1.95 |
| B | 2500 | 2.3 | TM9 | 6000 | 1.79 |
| B₄C | 2800 | 2.5 | Thorael | 5650 | 1.81 |
| TiB₂ | 3370 | 4.5 | Allien 1 | 5800 | 1.56 |
| graphite | 1.97 GPa | 1.67 | Allien 2 | 3000 | 0.97 |
| SiC | 13,8–41.4 GPa | 3.22 | | | |

Notes:
1. Advanced Fibers and Composite, by F. S. Galasso, 1989.
2. Carbon and High Performance Fibers, Directory, 1995.
3. Concise Encyclopedia of Polymer Science and Engineering, Ed. J. I. Kroschwitz, 1990.
4. Carbon Nanotubes, by M. S. Dresselhaus, Springer, 2000.

Projects

Below Readers find some example projects which utilize the suggest ideas.

Project 1

Air Bridge

There are a lot of islands in the world, located close to one another or located close to a continent, which have large transportation flows. For example:

1. Straits of Gibraltar (16 km); connects Europe with Africa.

2. English Channel (40 km); connects England with Europe.

3. Sicily and Italy (5 km).

4. The Dardanellies (2–5 km).

5. Various Japanese Islands.

6. Taiwan with mainland China (25 km).

7. Bering Straits (100 km) (Russia and America).

8. Sahalin-Asia (20 km) (Russia).

An estimation of the main parameters for a Gibraltar air bridge (16 km) are presented, this estimation is similar for the English Channel or the other bridges listed above.

The main parameters are computed for the following daily load flow (same in both directions):

1. 1000 cars, the weight of each is 1 ton, total is 1000 tons.

2. 1000 trucks, the weight of each is 10 tons, total is 10,000 tons.

3. 10,000 people, the weight of each is 100 kg, the total is 1000 tons.

The total daily load flow in one direction is 12,000 tons, for a total load flow of 24,000 tons.

Let us assume the average payload of a wing container is ⅔ of its maximum payload capability. The total payload capability of the wing container is 300 tons, thus the average payload is 200 tons for one container. Then we will need (12000/200)=60 flights per day in each direction.

Let us assume a flight (cable) speed of 100 m/sec (speeds up 250 m/sec can be used). The flight takes (16000/100) 160 sec (about 3 minutes) in one direction; the English Channel transit time (40 km) will be 7 min with a speed of 100 m/s and 3 min with a speed of 250 m/s. If the loading of the wing container takes 25 minutes, one wing container can make 50 flights per day. For 120 flights we will need in 3 wing containers.

Estimates for the cable assume they are manufactured from fibers which have a tensile strength of σ=620 kg/mm and density of 1.8 g/cc (for example, QC-8805). Let use a safety coefficient of 2.4, then an admissible σ=250 kg/mm². Let us use an aerodynamic efficiency (ratio of lift/drag) of 12 (current airplanes are up to 17, and gliders up 40). Then the drag of the container is (300/12) 25 tons. This is increased to 30 tons (we assume about 2–3% cable air drag plus 1–2% drag from the support flight devices). The cross-sectional area of the cable is (30000/250) 120 mm², and the cable diameter is D=12.4 mm. The weight of two cable branches (32 km) is 6912 kg≈7 tons. For aerodynamic efficiency of support flight devices equals 20–30 the additional drag will be 7000/20=350 kg or 350/30000=0.012=1.2% of the total trust.

The required energy impulse equals N=300000 n×100 m/sec=30 MgW over a 160 sec period. If we use an inertial accumulator of energy and the flight frequency equals 12 min, we will need in an engine with a steady state power output of N=30×160/12×60=6670 KW; this is equivalent to one turbo-engine. The weight of the inertial accumulator of energy (constructed from fibers) equals 30×160/0,75=6400 kg=6.4 tons.

Estimation of acceleration system requirements assume an acceleration for take-off and landing of a=0.5 g=5 m/s². Takeoff and landing distance is L=V²/2a=10000/10=1000 m=1 km. The thrust required for acceleration is T=Wa/g=300×5/10=150 tons. The cable has a cross-sectional area of (150000/250) 600 mm², a diameter of 28 mm², and a weight of 4320 kg.

Estimation of the support flight devices assumes that one device supports 1 km cable. The weight of 1 km cable with a cross-sectional area of 120 mm² is 216 kg. If lift coefficient equals 1, the necessary wing area equals 0.42 m², resulting in a wing size of 2×0.2 m.

Data of the flight container assumes a wing area of 480 m², a wing span of 80 m (80×6 m), the size of the container is 10×5×86 m, the useful area of the floor is 500 m², and the useful volume is 2500 m³.

For the suggested bridge we need only 11.4 tons of cable, 3 wing containers, a 6700 KW engine, an inertial accumulator of energy with a disc weight of 6.4 tons, and two simple ports with 1 km of runway length. The bridge system costs 10–30 million dollars and requires 6 months for construction. The English Channel tunnel costs billions of dollars, construction took many years, and delivery transit time is more than 0.5 hour. If the tunnel is damaged, the repair will be very expensive and take a long time.

Economical Estimation

Let us assume the cost of the air bridge is 15 million dollars (wing containers, engines, flywheels, and departure and arrival stations) and has a service life of 15 years (depreciation is 1 million per year). Employee costs assume 80 men with an average salary of $50K per year (maintenance is 5 millions per year, $14K per day), and fuel costs of $0.25 per liter ($10,850 per day). The total load flow is 24,000 tons per day. The direct operating costs will be less then $2 per ton ($2 per car). If the toll charge for using the bridge is $5 from 1 car (1 ton), the profit will be $13 million per year.

Project 2

Air line New York—Washington (340 km)

Let us take one wing cabin (container) with a weight of 100 tons. The payload is ⅔ of the full weight (66 tons≈660 passengers). The flight time with a speed of 200 m/s is 28.3 min≈30 min, or about 100 flights per day (in both directions). The total (maximum) number of passengers is 66,000 or 6,600 tons of payload per day. Assuming an aerodynamic efficiency of 16 (ratio of lift/drag), the required thrust is 100/16=6.2 tons. Assuming a thrust of 10 tons for one direction (includes cable drag and drag of support devices). For admissible cable tensile strength $\sigma$=250 kg/mm², the required cable cross sectional area is 40 mm², the cable diameter is 7.2 mm, the cable weight is 24.5 tons for a cable density of 1.8 g/cc. The air drag of a cable at an altitude of 7 km is 1.08 tons.

Estimation of drag for the support flight devices assumes the aerodynamic efficiency equals 25. Then the support device drag will be 24.5/25=1 ton. The total drag is 6.2+1.08+1=8.28 tons which is less than the 10 tons of thrust available. The required power is V·T=200×10,000×10=20 MgW or 40 MgW for both directions. This equals the power of 4, 10,000 KW turbo-jet engines.

The wing container has a wing area of 170 sq.m and a wingspan of 42 m.

Production Cost of One Passenger Delivered

Assume the cost of the installation is $20 million dollars and has a service life of 20 years. The system requires 40 employees with an average salary of $50K per year, the fuel cost is $0.25 per liter. The depreciation is $2750 per day, the salary is $5500 per day, and the fuel cost is $64750 per day. Assuming 66,000 daily passengers, we find that the delivery production cost is less than $1 per passenger (64750/66000). If this cost is divided by a loading coefficient of 0.75, the delivery cost is $1.3 per passenger. This is less a subway fare in New York. If a flight fare of $4.99 is charged, the profit is $173K per day or $63 million per year. You can live in New York and work in Washington D.C. The flight takes about 30 min, which is less than the average transit time of the NY subway.

Project 3.

Airline New York to Paris (6200 km)

Assume a flight speed of V=250 m/s, an altitude of H=11 km, and the cable is supported by wing devices. The New York to Paris flight time is (6,200,000/250)≈7 hours.

Let us take three wing cabins (containers) for one route, which are moving simultaneously in one direction. Each cabin has a weight of 100 tons (payload is 66 tons) and has an aerodynamic efficiency of 16 (ratio of lift/drag). The required cable thrust is about 6.2×3=18.6≈20 tons for one direction or 40 tons for both directions. There are 10 flights per day in one direction and 10 flights in the return direction. The total load capability is (6600×2) 13200 passengers in both direction per day or 1320 tons of payload.

Assume the cable is manufactured from whiskers, $C_D$, with a tensile strength of $\sigma$=8000 kg/sq.mm and density of 3.5 g.cc. Using a typical safety coefficient of 2.4, an admissible tensile strength is $\sigma$=3300 kg/sq.mm, the cable cross-sectional area of 12.1 sq.mm, and a cable diameter of 4 mm for a thrust of 40 tons in one direction. The cable weight is 262.6 tons (for 6200 km), and the cable drag is 3.3 tons (half the boundary layer is turbulent and half is laminar). If the aerodynamic efficiency of the support devices is 25, their additional drag is (262.6/25) 10.5 tons. The total drag is (18.6+3.3+10.5) 32.4 tons. That is less then the assumed thrust of 40 tons.

The wing cabin is the same as the New York—Washington D.C. project.

If the support device supports 10 km of cable (424 kg), the required wing area equals 0.743 sq.m, with a wing span of 3.3 m.

The required power is P=4000000×250=100 MgW for one end; that is 10 turbo-jet engines with 10,000 KW of power each.

Economical Estimation

The system installation cost is $30 million with a service lifetime of 10 years. Employee costs assume 100 men with an average salary of $50K per year, and fuel cost is $0.25 per liter.

Assuming a depreciation of $8.24K per day, salaries of $13.74K per day, and fuel costs of $324K per day; if the average load equals 75% of the maximum load, the number of the passengers is 9150 per day. The operational cost of the delivery of one passenger is $38 per man or $0.38 per kg. If the fare is $120 the profit is 80×9150=$732K per day= $266.5 million per year.

More then 90% of this cost is fuel; if aviation fuel is not required, a lower cost fuel (for example natural gas) can reduce operational costs proportional to the cost of the fuel.

Project 4

Ground Vehicles (For Example, Auto Highway)

Assume a closed-loop ground cable section with a length of 100 km in one direction. The cable is from fibers with an admissible tensile strength of $\sigma$=250 kg/mm² and a density of 1.8 g/cc. Also assume 1000 cars, weighting 1 ton each, connected to the line in one direction. Using an average friction coefficient of 0.05 requires a cable thrust of (1000× 0.05) 50 tons. The cable cross-sectional area is (50000/250) 200 mm², the cable diameter is 16 mm, and the cable weight (200 km) is 72 tons.

It may be shown that roller friction (ball bearing), and air friction (speed 30 m/s) will account for less than 3% of the total thrust.

The energy required for movement of 1000 tons at a speed of 30 m/s (108 km/hour or about 70 miles/hour) is (500, 000×30) 15 MgW at each end of the section (the total is 30 MgW), ( three turbo engines of 10,000 KW each are required for the two ends). This system may be used for highways or as an internal city system.

Project 5
Gas Line of the Length 2000 km (1250 Miles) and a Capability 20 Billions Cubic Meters Per Year There are a big demand of gas pipelines, for example, in the connection of Alaska to the USA or the Russia to the Europe. The ground gas (oil) pipeline is very expensive, requests years for building, damage of environment, It is often they across a territory of other country, which can steal gas or oil (as the Ukraine) or to capture ease's pipeline (as the Saudi Arabia).

Technical Data

Assume that a gas balloon (airship, dirigible) has the volume $10^4$ m$^3$ (diameter 11.3 m, length 115 m) (the balloon can have wings). The line has length 2000 km, speed 35 m/sec, and balloons are connected every 500 m. The delivery time is 19 hours (delivery time by pipeline is 3–5 times more, oil line is 30–50 times more).

It is easy to calculate, then a transit capability of this gas line is about 20 billions cubic meter per year.

The line contains 4000 balloons and one middle drive station. The cable has an admissible tensile strength 200 kg/sq.mm, a cross section area of the cable is 150 sq.mm, diameter 14 mm, the cable weight is 1080 tons.

The total balloon drag is 60 tons, the total cable drag is 1.3 tons. The total power of 3 engines is 18,000 kW (it is power of three aviation gas turbines). The density of natural gas is 0.72 kg/cub.m, the density of air is 1.225 kg/cub.m., the payload lift force of each balloon is about 3–4 tons.

Economical Estimation

The balloon area is 3140 sq.m., the weight is 500 kg. Assume 1 sq.m a balloon film (cover) a cost $0.15, then a balloon cost is about $2000 each. The total cost of 4000 balloons is $8 millions of dollars. If 1 kg cable is cost $1, the cable cost is about $1 million. We include two engine (gas turbines) and departure and arrival ports and take the total installation cost $15 millions and lifetime 15 years. The depression is $1 million per year.

Take a maintenance $2 millions per year, the gasoline cost is $0.25 per liter. The fuel cost is $30K per day or $10 millions per year. The total annual expenses is $13 millions per year. The 77% of this expenses is the cost of the fuel (gasoline for driving).

The production delivery cost of 1000 m$^3$ gas is $0.7 per 1000 cubic meter for distance up 2000 km (1250 miles). If a fee for the delivery 1000 m$^3$ gas is $1, the profit is $18.6 millions per year. We can decrease the production delivery cost if we will use the wind energy.

Additional Possibility

Every balloon can lift 2–3 tons of useful load. It means we can delivery about 15,000 tons payload (for example, oil) per day in one direction.

A.Bolonkin, "Method for Movement of Vehicles. . ."

Brief Description of the Several Views of the Drawings

Figure 8B:
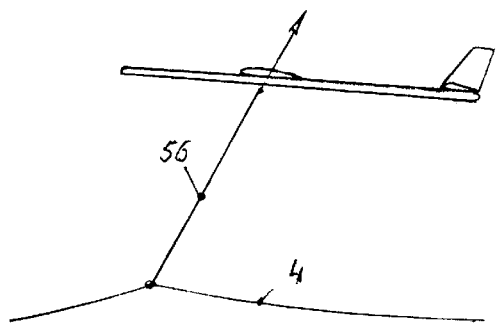
FIG. 8b. Support wing device (side view).
Figure 8C:
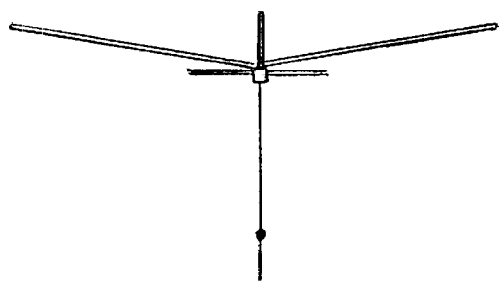
FIG. 8c. Support wing device (front view).
Figure 9:
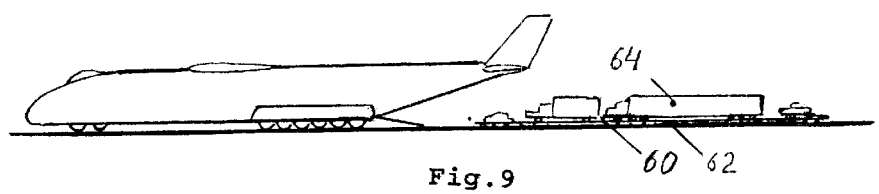
FIG. 9. Loading of the wing container via a loading platform.
Figure 10C:
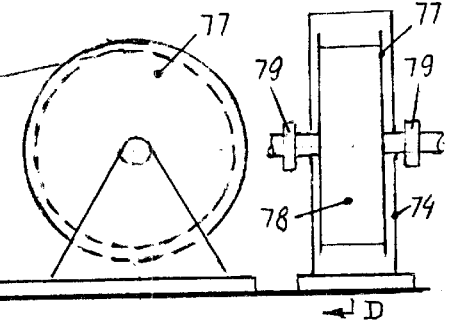

FIG. 1. Air bridge (side view).
1—Terminal;
2—Strait, river, mountain, canyon, etc.;
4—main closed-loop (bridge) cable (loop, rope, chain);
6—wing container (cabin);
8—support devices (support wings);
10—direction of a wing container motion.
FIG. 2. Air bridge (top view).
FIG. 3. Terminals.
12—departure (starting) port (terminal);
13—acceleration station;
14—braking station;
16—closed-loop cable (loop, rope) of acceleration station;
18—rollers;
20—drive system (station);
22—connection-disconnection device to an acceleration cable;
24—connection-disconnection device to the main (bridge) cable;
26—landing (braking) runway of the wing container;
28—delivery (arrival) (unloading) port;
30—departure (loading) port;
32—rollers of the main cable;
34—engines of the main cable.
FIG. 4.Wing container (cabin) (side view).
40—wing container.
FIG. 5. Wing container (front view).
FIG. 6. Wing container (top view).
40—wing container (or cabin);
42—wing;
44—flaps;
46—ailerons;
48—tail (stabilizer, fin, control system);
49—elevator.
FIG. 7. Loading to the wing container.
FIG. 8a. Support wing device (top view).
50—support wing device;
51—flaps;
52—wing of the support wing device;
53—elevator;
54—tail (stabilizer) of the support wing device.
FIG. 8b. Support wing device (side view).
56—wing cable;
FIG. 8c. Support wing device (front view).
FIG. 9. Loading of the wing container via a loading platform.
60—loading platform;
62—rollers (wheels) of the loading platform;
64—loads.
FIG. 10a. Drive System (Drive Station).
65,66,67—clutches;
68—brake;
69—variable (tape) transmission;
70—energy accumulator (it may be inertia wheel or flywheel);
72—motor.
FIGS. 10 b,c. Variable tape transmission (b—side view, c—front view).
74—body;
76,77—drums;
78—tape of variable transmission;
79—clutch.

FIG. 11a. Airline transport system (side view); supported on columns.
- 80—main closed-loop cable;
- 81—column;
- other notes are same with FIG. 11b.

FIG. 11b. Airline transport system (side view); supported by balloons.
- 82—balloon cable holddown;
- 83—sag of main cable;
- 84—balloon;
- 86—suspension of cable to the balloon;
- 88—wing container (wing cabin);
- 90—terminal;
- 92—terminal;
- 94,95—engines of the main cable.

FIG. 12. Airline transport system (front view)(view at AA) when suspension is to ground.
- 96—connection to ground.

FIG. 13. Airline transport system (front view)(view at AA) when suspension is at a sea button.
- 97—connection to sea bottom.

FIG. 14. Sea (river) line.
- 98—suspension of the main cable via a sea platform.
- 99—sea (river) ship.

FIG. 15. Suspension of the main cable by air-wing balloons (side view).
- 100—balloon;
- 102—inflatable balloon wing;
- 104—rotation suspension (connection);
- 106—connection devices;
- 108—cable suspension;
- 110—main cable;
- 112—wing container;
- 114—container cable;
- 116—connection device of wing container;
- 118—wind;
- 120—wing flaps;
- 122—wing support cables.

FIG. 16. Suspension of the main cable by air-wing balloons (front view).

FIG. 17. Ground movement system for auto, car, track, train, and other ground vehicles.
- 128—movement (transportation) system for ground vehicles;
- 130—main (closed-loop) cable;
- 132—rollers;
- 134—engine;
- 136—vehicle;
- 138—connection device;
- 139—direction of motion.

FIG. 18. connection of two ground movement systems.
- 140—the first system;
- 142—the second system.

FIG. 19. Connection of two additional branch systems to main system (change lines).
- 146—main system;
- 148,149—additional branch systems.

FIG. 20. The movement (transport) system for trains.
- 150—movement system;
- 151—train.

FIGS. 21a,b. Elevated cable suspension for ground movement system.
- 152—column;
- 154—main cable;
- 155—vehicle (for example, car);
- 156—connection bar (rod);
- 158—connection-disconnection device.

FIG. 22a. Underground cable suspension of the movement system (side view).

FIG. 22b. Underground cable suspension of the movement system (front view).
- 160—underground main cable.

FIG. 23a. Cross section of the Support rollers of the suspension system with 4 rollers (side view).

FIG. 23b. Support rollers of the suspension system with 4 rollers.
- 161—suspension device;
- 162—main cable;
- 164—roller of suspension system;
- 166—spring of the roller;
- 168—guides, front edge of the suspension devices, 169—connection device.

FIG. 23c. Front view of the suspension device.

FIG. 23d. An initial contact of the connection and suspension devices.

FIG. 23e. Position of the connection and suspension devices after sliding the connection devices along edge 169.

FIG. 23f. Cross section of the support rollers of the suspension system with 2 rollers.

FIG. 24. Connection-disconnection device (for section FF FIG. 26).
- 170—main cable;
- 172—upper roller;
- 174—lever of the upper roller (catcher, cable gripper);
- 176—lower roller;
- 178—brake of the lower roller;
- 179—gap cable for a cover 236 (fog. 28c).

FIG. 25. Connection devices in a moment when that is moving throw the support rollers of the suspension system.
- 180—gap cable for the rollers 164 of FIG. 23f.
- 182—way (swelling, bulge) for the rollers 164.

FIG. 26. The connection-disconnection device (schematic side view).
- 200—connection-disconnection device;
- 201—groove for opening the connection device;
- 202—guide of the support cable roller;
- 203—lock of rollers (levers 174);
- 204—rollers of the support devices (164 on FIG. 23);
- 205—top edge of the connection device;
- 206—front edge of the connection device;
- 207—lower edge of the connection device;
- 208—upper rollers of connection device;
- 210—lower rollers of connection device;
- 212—connection to the rod;
- 214—rod;
- 216—control device.

FIG. 27a. Scheme of the connection of the different movement systems (to change cable lines) (side view).
- 220,222—transport cables of two movement systems;
- 223—key (bulge, boss, cog), which closes the level 174 (FIG. 24). 224,226—rollers;

225—the surface, which turn the connection devices in vertical (requested, needed) position;

227—key (bulge, boss, cog), which moves apart (opens) the level 174 (FIG. 24) and pass the rollers 224,226.

FIG. 27b. Scheme of the connection of the different movement systems (to change cable lines) (top view).

228,229,230—different lines (different directions) of the transportation network.

FIGS. 28a,b,c. Scheme of the underground movement system.

231—connection device;

232—body of the underground groove for transport cable;

234—transport (main) cable;

236—sliding plate (cover) of the cable groove (excavation, hole, pit, sink);

238—spring;

240—bevel of the sliding plate (cover);

242—edge of the connection device whereby the cover is opened;

244—bevel on the upper surface of the cover for initial opening of the plate by the edge, 242. FIG. 29. A man on skateboard is connected to the transport system for movement.

250—skateboard;

252—man;

254—connection rod;

256—control.

FIG. 30. Airlines used as a gas lines.

260—air balloon (dirigible, airship);

262—payload;

264—balloon connection cable;

266—connection device;

268—main closed-loop cable (loop, rope);

270—fly apparatus (support wings) for a return of the packed balloons and a support of the main cable (rope);

272—a mooring mast of an arrival port for pumping off a gas from balloons and for unload of payload;

274—engine of driving station;

276—link device of the loops;

278—mooring mast of the departure port for pumping gas to balloons (dirigible, airship).

FIG. 31. Wind engines used for movement vehicles.

280—wind engine (for example, propeller);

282—wing which support the wind engine at an altitude;

284—cable transmission of energy (transfer energy system) from the wind engine to the drive station;

286—aircraft;

288—support cable wing;

290—main cable;

292—drive station.

Result of the patent investigation Patents are regarding to the topic "Bolonkin's Method for Movement of Vehicles and Installation for It". Inventor: Alexander Bolonkin USA U.S. Pat. No. 5,860,785 Towing vehicle for maneuvering aircraft, U.S. Pat. No. 5,562,388 Vehicle for transportation an aircraft on the ground.

U.S. Pat. No. 6,179,250 Air and Space Vehicle propulsion system.

U.S. Pat. No. 5,570,638 Rescue vehicle for a cable railway.

U.S. Pat. No. 5,151,004 Vehicle for moving aircraft vehicle.

U.S. Pat. No. D331,893 Combined aircraft and road vehicle.

U.S. Pat. No. 5,013,205 Towing vehicle for shunting aircraft on the ground.

U.S. Pat. No. 5,489,011 Vehicle clutch cable self-adjusting mechanism.

U.S. Pat. Nos. 5,461,961 D356,980 5,381,987 5,308,212 5,302,074 5,254,572 d340,426 D334,547 5,185,973 5,467,663 6,076,288 5,575,215

U.S. Pat. Nos. 3,999,489 5,483,863 5,441,221 5,350,138 5,191,162 4,916,999 4,802,639 4,747,334 4,554,905 4,265,416 3,972,261 5,626,310 5,529,264 5,184,913 4,932,306 4,747,334 4,522,126 4,196,839 3,837,107 3,897,732 3,465,638 H000853 U.S. Pat. Nos. 3,072,020 3,131,597 3,132,562 3,158,062 4,344,592 4,795,113 4,881,446 5,198,610

1) Development in high-speed-vehicle propulsion systems, AIAA,1996.
2) 12th Symposium Propulsion System, 1995.

Investigator: A.Blekherman, Ph.D.

I claim:

1. Method for movement of flight vehicles comprising the steps:

connecting at least two rollers placed one in a port of departure and one in a port of arrival with closed-loop cable located at atmosphere;

supporting said cable in atmosphere with a support system including at least one of the following devices: wings rigidly connected to cable, air balloons, columns, rollers;

connecting at least one of said rollers to at least one drive station located on ground and including at least one engine;

running said cable with constant speed more than 50 kilometers per hour;

using for delivering of flight vehicles at least one of the following: wing containers, wing cabins, airplanes, balloons, airships, dirigibles, gliders;

accelerating said flight vehicles with an acceleration system located on the ground;

connecting at least one said flight vehicle to said cable;

flying said flight vehicle above said cable using said cable as a pull (trust) system;

delivering said vehicle to a required point;

disconnecting said vehicle from said cable at the required point;

braking said vehicles with a braking system;

using said method for design and construction of at least one of the following systems: air lines, long air bridges, gas lines, located in atmosphere.

2. The method as recited in claim 1 comprising of at least one of the following steps:

connecting said closed-loop cables to a network having a set of different departure and arrival ports;

running said cables of said network with constant speed;

accelerating said vehicle before connecting it to said network;

making said cables from light, strong material such as artificial fibers, filaments, whiskers, nanotubes;

using wind engines for movement of said vehicles of said cable network;

placing said ports from one to another more than one hundred of kilometers apart.

3. Method for movement of ground vehicles comprising the steps:
   connecting at least two rollers placed one in a port of departure and one in a port of arrival with closed-loop cables (loops) and links located at least in one of the following places: above ground, ground surface, and water surface;
   supporting said cable with a cable support system including at least one of the following items: columns, rollers;
   connecting at least one of said rollers to at least one drive station including at least one engine;
   connecting said closed-loop cables to a network having a set of different departure and arrival ports;
   running said cable with constant speed more than thirty kilometers per hour with said drive station;
   accelerating ground vehicles with a motor located on said vehicle;
   connecting at least one said ground vehicle to said cable;
   moving said ground vehicle on ground surface with said cable using said cable as a pull (trust) system;
   delivering said vehicle to a required point;
   disconnecting said vehicle from said cable at the required point;
   braking said vehicles with a braking system located on vehicle;
   using as said ground vehicles at least one of the following: conventional cars, buses, trucks, street cars, roller skates, roller boards, roller container, roller cabin, ships.

4. The method as recited in claim 3 comprising of at least one of the following steps:
   placing said ports from one to another more then fifty of kilometers apart;
   accelerating said vehicle at acceleration stations before connecting it to said network;
   making said cables from light, strong material such as artificial fibers, filaments, whiskers, nanotubes;
   using said method for design of at least one of the following systems: highway intercity and interstate transport systems, city passenger (load) transport systems, ground transport lines, tunnel transport system, water transport lines.

5. An Installation for movement of flight vehicles comprising:
   departure and arrival ports;
   a set of rollers placed at said ports of departure and arrival, at points of direction change, and at middle points;
   closed-loop main cable (loop) connecting said ports of departure and arrival, located in atmosphere, and forming a transport system;
   drive station includes engines placed near rollers and connected to at least one of said rollers;
   flight vehicles for transportation of people and payloads;
   accelerating system located in said ports for acceleration of said vehicles;
   braking system located in said vehicles for braking of said vehicles;
   cable suspension (support) system located along said cables with said cables being supported in atmosphere;
   devices for connection and disconnection of said flight vehicles to said cable and placed on said vehicles;
   vehicle cable located on said flight vehicle for connection to said main cable;
   control system located on said connection devices whereby a pilot can connect and disconnect said vehicle from said main and vehicle cables.

6. The Installation, as recited in claim 5, further includes at least one of the following systems:
   a set of closed-loop cables (loops) joined sequentially one to another, said set forms a transport network connecting said ports of departure and arrival;
   link connection system, which connects said cables;
   loading system located in said ports for fast loading and unloading of said vehicles;
   energy storage system disposed at said driver station, near said engines;
   said network is placed on the earth's surface and includes extending into the atmosphere;
   said flight vehicles include at least one of the following vehicles: wing containers, wing cabins, airplanes, conventional gliders, aircraft, balloons, airship, dirigibles, wing dirigibles;
   drive stations located on earth's surface and connected to said main closed-loop cables for movement of said vehicles of said transport network with said closed-loop cables;
   said acceleration, brake, support, control systems and said vehicles for network;
   wind engines located at altitude and connected to said drive stations with cable transmissions.

7. The Installation as recited in claim 6 further includes at least one of the following suspension (support) systems and devices:
   high altitude atmospheric suspension system in which said cables are placed in the atmosphere, except ends, and supported by at least one of the following suspension devices:
   (a) support wing devices connected to said closed-loop cables,
   (b) air balloons connected to the earth's surface by a cable,
   (c) air balloons having wings and connected to the earth's surface by a cable,
   (d) support wind devices;
   air suspension system located on columns placed along said cables on the earth's surface;
   all said suspension systems above have support devices connected to said closed-loop cable and to said suspension system.

8. The Installation as recited in claim 7 wherein:
   support wing devices include at least one of the following parts: wings, flaps located on wing, elevator, control of said elevator and flaps, wing cables which connect said wing to said closed-loop cable of the installation, control;
   said support wind devices include at least one of the following parts: kites, wings, wings cables, sliding connection, control.

9. The Installation as recited in claim 6 further includes at least one of the following systems:
   said acceleration system which further includes at least one of the following parts: minimum of two rollers, closed-loop acceleration cable (loop) around said rollers, clutches, variable transmission, storage energy, engine, connections to said cable, takeoff runway;

said braking system further includes at least one of the following parts: landing runway located in said arrival port, brakes located on said vehicle;

said loading system which includes: platform, rollers located under said platform, and engine.

10. The Installation as recited in claim 6 further includes:

closed-loop network main cables connect said departure and arrival ports;

said vehicles are balloons, airships, dirigibles, wing dirigibles filled by a natural gas that deliver said natural gas to said arrival port;

said delivery and arrival ports further include: mooring masts, equipment for pumping said natural gas, loading and unloading payloads, equipment for packing of balloon cover, fly apparatus for support of said main cable and for delivery of a packed balloon cover back to said departure port.

11. The Installation as recited in claim 6 further includes at least one of the following devices:

wind engines located at atmosphere and connected to said drive station with an engine cable transmission;

said wind engine has a wing which supports said wind engine at atmosphere;

said engine cable transmission is an energy transfer system which transfer a wind energy from said wind engine to said drive station;

said transfer system has at least one of the following devices: a gear box, clutches, control, electric generator.

12. The installation as recited in claim 5 wherein:

said cable is made from artificial, light, strong materials of at least one of the following types: fibers, filaments, whiskers, nanotubes; from carbon, diamond, metal, alloys, glass, polymers, having a tensile strength of more than 100 kg/sq.mm.

13. An Installation for movement of ground vehicles comprising:

departure and arrival ports;

a set of rollers placed at said ports of departure and arrival, at points of direction change, and at middle points;

closed-loop main cable (loop) connecting said ports of departure and arrival, located at ground, and forming a transport system;

drive station including engines placed near rollers and connected to at least one of said rollers;

ground vehicles for transportation of people and payloads;

accelerating system located in said vehicles for accelerating said vehicles;

braking system located in said vehicles for braking said vehicles;

cable suspension (support) system located along said cables with said cables being supported at ground;

devices for connection and disconnection of said ground vehicles to said cable which are placed on said vehicles;

control system located on said connection devices whereby a driver can connect and disconnect said vehicle from said main cables.

14. The Installation, as recited in claim 13, further includes at least one of the following systems:

a set of closed-loop cables (loops) joined sequentially one to another, said set forms a transport network connecting said ports of departure and arrival;

link connection system, which connects said cables;

loading system located in said ports for fast loading and unloading of said vehicles;

energy storage system disposed at said drive station, near said engines;

said network is placed on the earth's surface;

said ground vehicles include at least one of the following vehicles: conventional cars, buses, trucks, street cars, trains, roller skates, roller boards, river and sea ships;

drive stations located on earth's surface and connected to said main closed-loop cables for movement of said vehicles of said transport network with said main closed-loop cables;

cable suspension system located at least on of the following places: above ground on columns placed along said cables on the earth's surface, on ground, in grooves on ground surface; said suspension system includes a support devices and rollers;

said cable is made from artificial, light, strong materials of at least one of the following types: fibers, filaments, whiskers, nanotubes; from carbon, diamond, metal, alloys, glass, polymers, having a tensile strength of more than 100 kg/sq.mm.

15. The Installation as recited in claim 14 wherein:

said support devices includes at least one of the following parts: body, minimum of two rollers located in one plate in opposite positions relative to said closed-loop cable; springs connected to said rollers; a lock whereby said rollers are fixed in a given position; slender surface located at an entry of said support device whereby said connection device is turned in a needed position before entering into said support device;

ground suspension system includes at least one of the following parts: body located in ground, surface groove; moving apart plates located in said body; spring connected to said plates;

said plates have slanting surfaces and bulges which allow plates to move apart when they contact with the leading edge of said connection device;

link connection system includes at least one of the following parts of said link: body, rollers, slanting surface which turns said connection devices in the vertical position; device which connects different loops to given loop;

control system connected to said link system;

energy storage system which includes at least one of the following parts: body, inertial flywheel, transmission, and clutches.

16. The Installation as recited in claim 15 wherein:

said transmission includes: body, two drums, tape connecting said drums, clutches connecting the transmission to outer devices.

17. The installation as recited in claim 16 wherein:

said devices for connection and disconnection include at least one of the following parts: body, rollers, catcher, cable gripper connected to at least one said roller, brake connected to at least one said roller, leading edge which opens a lock and a cover to move apart rollers of said support devices, leading edge which opens and moves apart plates of cover of said ground suspension system, control of connection-disconnection devices;

control of said connection-disconnection device includes at least one of the following parts: source of electric energy, wires, conductors, solenoids, and lock.

* * * * *